United States Patent [19]
Pantell et al.

[11] Patent Number: 5,311,525
[45] Date of Patent: May 10, 1994

[54] NONLINEAR OPTICAL COUPLER USING A DOPED OPTICAL WAVEGUIDE

[75] Inventors: Richard H. Pantell, Menlo Park; Robert W. Sadowski, Stanford; Michel J. F. Digonnet, Palo Alto; Herbert J. Shaw, Stanford, all of Calif.

[73] Assignee: The Board of Trustees of the Leland Stanford University, Stanford, Calif.

[21] Appl. No.: 861,322

[22] Filed: Mar. 31, 1992

[51] Int. Cl.$^5$ .............................. H01S 3/07; G02B 6/26
[52] U.S. Cl. .......................................... 372/6; 372/19; 372/21; 372/102; 385/28
[58] Field of Search .................. 372/6, 19, 20, 21, 22, 372/102; 359/328; 385/28

[56] References Cited

U.S. PATENT DOCUMENTS

| | | | |
|---|---|---|---|
| 4,768,851 | 9/1988 | Shaw et al. | 385/28 |
| 4,828,350 | 5/1989 | Kim et al. | 385/28 |
| 4,832,437 | 5/1989 | Kim et al. | 385/1 |
| 4,895,421 | 1/1990 | Kim et al. | 385/28 |
| 4,915,468 | 4/1990 | Kim et al. | 385/28 |
| 5,121,460 | 6/1992 | Tumminelli et al. | 385/126 |
| 5,134,620 | 7/1992 | Huber | 372/6 |
| 5,140,456 | 8/1992 | Huber | 359/341 |
| 5,151,908 | 9/1992 | Huber | 372/6 |
| 5,159,601 | 10/1992 | Huber | 372/6 |
| 5,191,586 | 3/1993 | Huber | 372/6 |

OTHER PUBLICATIONS

H. G. Park, C. C. Pohalski, and B. Y. Kim, "Optical Kerr Switch Using Elliptical Core Two-Mode Fiber", *Optics Letters*, vol. 13, No. 9, pp. 776-778, Sep. 1988.

A. M. Glass, "Materials for Optical Information Processing," *Science*, vol. 226, pp. 657-662, Nov. 9, 1984.

D. F. Eaton, "Nonlinear Optical Materials," *Science*, vol. 256, pp. 281-287, Jul. 19, 1991.

G. I. Stegeman et al., "Third Order Nonlinear Integrated Optics," *Journal Lightwave Technology*, vol. 6, No. 6, pp. 953-970, Jun. 1988.

R. A. Betts et al., "Nonlinear Refractive Index in Erbium Doped Optical Fiber Theory and Experiment," *IEEE Journal of Quantum Electronics*, vol. 27, No. 4, pp. 908-913, Apr. 1991.

R. K. Jain and R. C. Lind, "Degenerate Four-Wave Mixing in Semiconductor-Doped Glasses," *Journal of the Optical Society of America*, vol. 73, No. 5, pp. 647-653, May 1983.

G. R. Olbright, et al., "Optical Nonlinearities of Glasses Doped with Semiconductor Micro-Crystallites," *Optics Letters*, vol. 12, No. 6, pp. 413-415, Jun. 1987.

S. R. Friberg and P. W. Smith, "Nonlinear Optical Glasses for Ultrafast Optical Switches," *IEEE Journal*
(List continued on next page.)

*Primary Examiner*—Frank Gonzalez
*Attorney, Agent, or Firm*—Knobbe, Martens, Olson & Bear

[57] ABSTRACT

An optical mode coupling apparatus includes an Erbium-doped optical waveguide in which an optical signal at a signal wavelength propagates in a first spatial propagation mode and a second spatial propagation mode of the waveguide. The optical signal propagating in the waveguide has a beat length. The coupling apparatus includes a pump source of perturbational light signal at a perturbational wavelength that propagates in the waveguide in the first spatial propagation mode. The perturbational signal has a sufficient intensity distribution in the waveguide that it causes a perturbation of the effective refractive index of the first spatial propagation mode of the waveguide in accordance with the optical Kerr effect. The perturbation of the effective refractive index of the first spatial propagation mode of the optical waveguide causes a change in the differential phase delay in the optical signal propagating in the first and second spatial propagation modes. The change in the differential phase delay is detected as a change in the intensity distribution between two lobes of the optical intensity distribution pattern of an output signal. The perturbational light signal can be selectively enabled and disabled to selectively change the intensity distribution in the two lobes of the optical intensity distribution pattern.

56 Claims, 9 Drawing Sheets

OTHER PUBLICATIONS

*of Quantum Electronics*, vol. QE-23, No. 12, pp. 2089-2094, Dec. 1987.

E. Desurvire et al., "High Gain Erbium-Doped Traveling-Wave Fiber Amplifier," *Optics Letters*, vol. 12, No. 11, pp. 888-990, Nov. 1987.

E. Desurvire, M. Digonnet, and H. J. Shaw, "Theory and Implementation of a Raman Active Fiber Delay Line," *IEEE Journal of Lightwave Technology*, vol. LT-4, vol. 4, pp. 426-443, Apr. 1986.

M. M. Fejer, M. J. F. Digonnet, and R. L. Byer, "Generation of 22 mW of 532 nm Radiation by Frequency Doubling in $MgO:LiNbO_3$," *Optics Letters*, vol. 16, No. 13, pp. 995-997, Apr. 1986.

B. Y. Kim and H. J. Shaw, "All-Fiber-Optic Gyroscopes," *SPIE*, vol. 719, Fiber Optic Gyros: 10th Anniversary Conference, pp. 70-80, 1986.

M. J. F. Digonnet, "Closed-Form Expressions for the Gain in Three-and Four-Level Laser Fibers", *IEEE Journal of Quantum Electronics*, vol. 26, No. 10, pp. 1788-1796, Oct. 1990.

M. C. Nuss et al., "Femtosecond Carrier Relaxation in Semiconductor-Doped Glasses" *Applied Physics Letters*, vol. 49, No. 25, pp. 1717-1719, Dec. 1986.

R. A. Bergh, et al., "Single-Mode Fiber Optic Directional Coupler," *Electronics Letters*, vol. 16, No. 7, pp. 260-261, Mar. 27, 1980.

D. Cotter, C. N. Ironside, B. J. Ainslie, and H. P. Girdlestonne, "Picosecond Pump-Probe Interferometric Measurement of Optical Nonlinearity in Semiconductor-Doped Fibers," *Optics Letters*, vol. 14, No. 6, pp. 317-319, Mar. 1989.

N. Finlayson et al., "Picosecond Switching Induced by Saturable Absorption in a Nonlinear Directional Coupler," *Applied Physics Letters*, vol. 53, No. 13, pp. 1144-1146, Sep. 1988.

E. Desurvire, "Study of the Complex Atomic Susceptibility of Erbium-Doped Fiber Amplifiers", *Journal of Lightwave Technology*, vol. 8, No. 10, pp. 1517-1527, Oct. 1990.

S. C. Fleming and T. J. Whitley, "Measurement of Pump Induced Refractive Index Change in Erbium Doped Fibre Amplifier," *Electronics Letters*, vol. 27, No. 21, pp. 1959-1961, Oct. 1991.

B. Y. Kim, J. N. Blake, S. Y. Huang and H. J. Shaw, "Use of Highly Elliptical Core Fibers for Two-Mode Fiber Devices," *Optics Letters*, vol. 12, No. 9, pp. 729-731, Sep. 1987.

J. B. Blake, S. Y. Huang, B. Y. Kim and H. J. Shaw, "Strain Effects on Highly Elliptical Core Two-Mode Fibers," *Optics Letters*, vol. 12, No. 9 pp. 732-734, Sep. 1987.

Walter Koechner, "Solid-State Laser Engineering," *Springer-Verlag Services in Optical Sciences*, vol. 1, New York, 1976.

Digonnet, et al., "Fiber Optic Components", *Optical Fiber Sensors: Principles and Components*, 1988, pp. 209-248.

Pantell, Richard H., et al., "Fundamentals of Quantum Electronics", John Wiley & Sons, Inc., New York, London, Sydney, Toronto, 1969, p. 20-157.

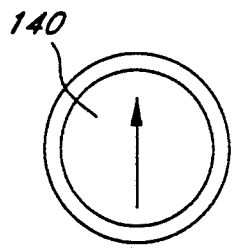
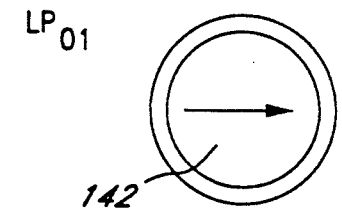
FIG. 3a    FIG. 3b
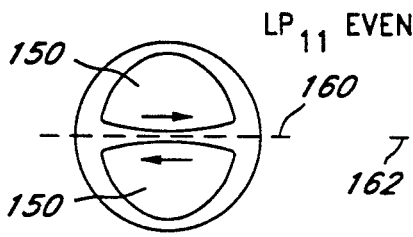
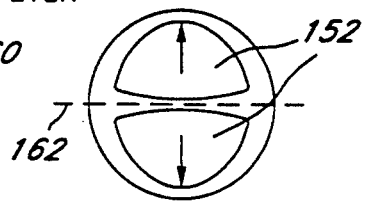
FIG. 3c    FIG. 3d
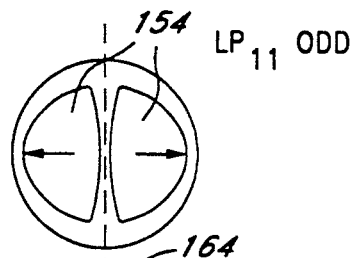
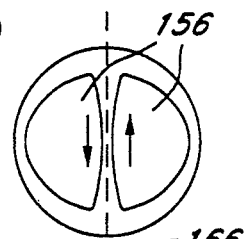
FIG. 3e    FIG. 3f
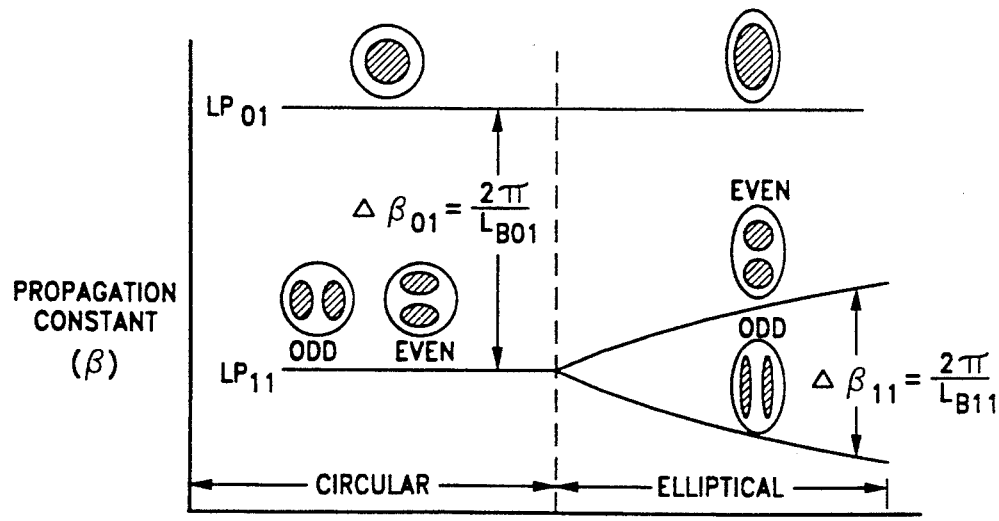
FIG. 4

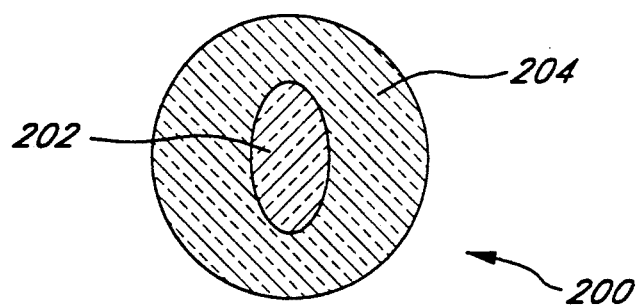
FIG. 5
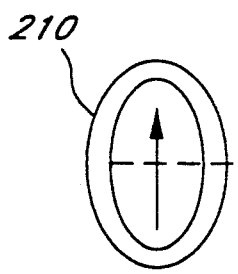 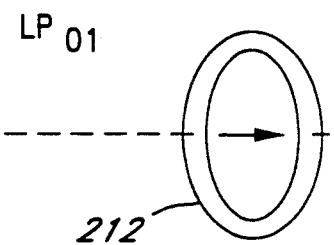 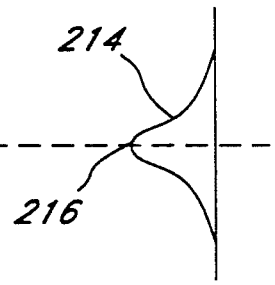
FIG. 6a  FIG. 6b  FIG. 6c
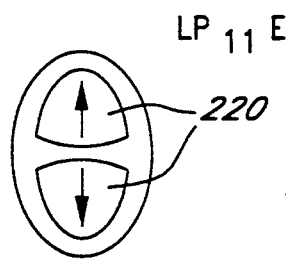 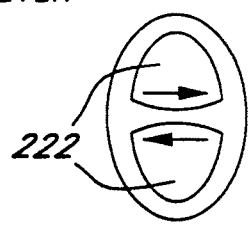 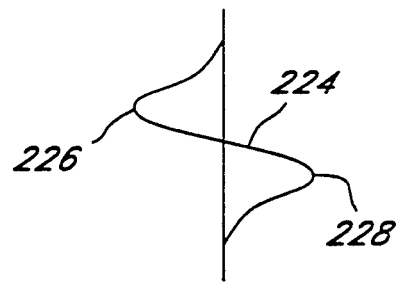
FIG. 6d  FIG. 6e  FIG. 6f
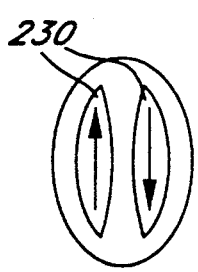 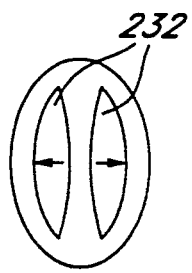
FIG. 6g  FIG. 6h

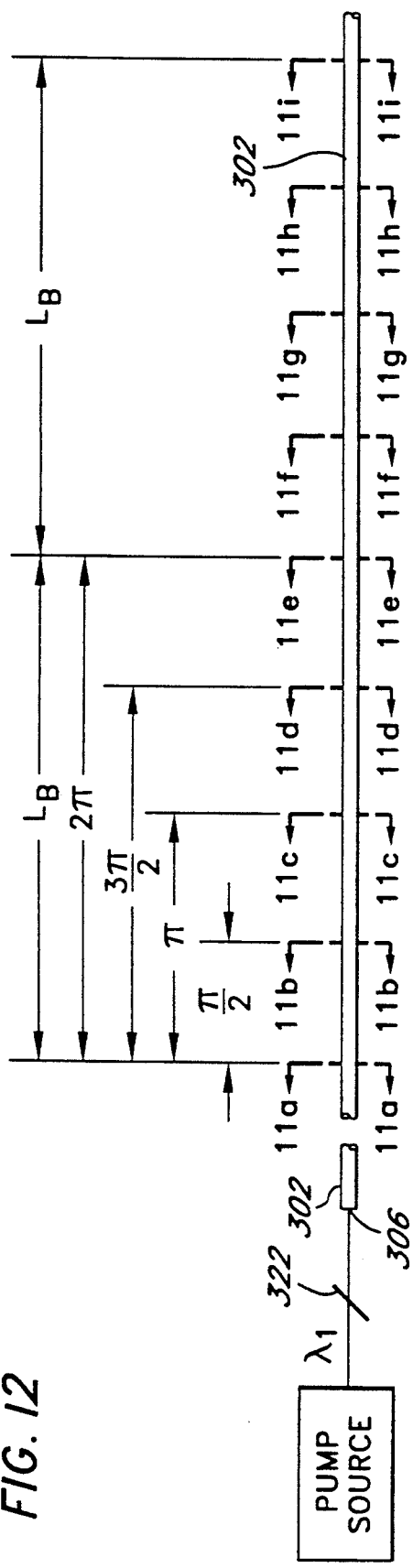

NONLINEAR OPTICAL COUPLER USING A DOPED OPTICAL WAVEGUIDE

FIELD OF THE INVENTION

The present invention relates generally to optical waveguide devices and, more particularly, to devices which incorporate two-mode optical waveguides to control the propagation of optical energy in the two modes of the waveguide.

BACKGROUND OF THE INVENTION

OPTICAL FIBER

An optical fiber is an optical waveguide having a central core surrounded by an outer cladding. The refractive indices of the core and cladding are selected so that optical energy propagating in the optical fiber is well-guided by the fiber.

As is well known in the art, a single optical fiber may provide one or more propagation paths under certain conditions. These propagation paths are commonly referred to as the normal modes of a fiber, which may be conceptualized as independent optical paths through the fiber. Normal modes have unique electric field distribution patterns which remain unchanged, except for amplitude as the light propagates through the fiber. Additionally, each normal mode will propagate through the fiber at a unique propagation velocity.

The number of modes which may be supported by a particular optical fiber is determined by the wavelength of the light propagating therethrough. If the wavelength is greater than a "second-order mode cutoff" wavelength (i.e., the frequency of the light is less than a cutoff frequency), the fiber will support only a single mode. If the wavelength is less than cutoff (i.e., the frequency is greater than the cutoff frequency), the fiber will begin to support higher order modes. For wavelengths less than, but near cutoff, the fiber will support only the fundamental, or first-order mode, and the next, or second-order mode. As the wavelength is decreased, the fiber will support additional modes, for example, a third-order, fourth-order, etc.

Each of the normal modes (e.g., first-order, second-order, etc.) are orthogonal, that is, ordinarily, there is no coupling between the light in these modes. The orientation of the electric field vectors of the modes defines the polarization of the light in the mode, for example, linear vertical or linear horizontal. A more complete discussion of these modes, and their corresponding electric field patterns, will be provided below.

A number of devices have been constructed to utilize the orthogonality of the modes of an optical fiber to provide selective coupling between the modes. For example copending U.S. patent application Ser. No. 884,871, now U.S. Pat. No. 4,768,851, entitled "Fiber Optic Modal Coupler," assigned to the assignee of this invention, describes a device which couples optical energy from the first-order mode to the second-order mode, and vice versa. U.S. patent application Ser. Nos. 820,513 and 909,503, both abandoned in favor of Ser. No. 048,142, now U.S. Pat. No. 4,832,437, entitled "Fiber Optic Inter-Mode Coupling Single-Sideband Frequency Shifter," and assigned to the assignee of this invention, disclose frequency shifters which couple optical energy from one propagation mode to another propagation mode while shifting the frequency of the optical energy. U.S. patent application Ser. No. 820,411, now U.S. Pat. No. 4,828,350 entitled "Fiber Optic Mode Selector," assigned to the assignee of the present invention, discloses a device which separates optical energy propagating in one of the first-order and second-order propagation modes from the other of the first-order and second-order propagation modes.

Neodymium- and Erbium-Doped Optical Fibers

Doped fibers have had interesting commercial applications as light sources and amplifiers. In recent years, doped fibers, and in particular, Erbium-doped fibers have received increasing attention as possible sources and for amplification purposes, especially in the low loss fiber communication window at 1500 nm. It is possible to obtain a high gain when the Erbium dopant is properly doped into a fiber, typically a silica fiber. The light emitted by Erbium-doped fibers easily couples into other fibers with similar mode sizes. An Erbium-doped fiber is also thermally relatively stable. Additionally, Erbium-doped fibers emit higher wavelength light than Neodymium-doped fibers, which makes them less sensitive to radiation induced loss mechanisms.

A theoretical analysis of amplified spontaneous emission can be found in an article by E. Desurvire et al, "Amplification of Spontaneous Emission in Erbium-Doped Single-Mode Fibers," *Journal of Lightwave Technology*, Volume 7, No. 5, pp. 835–845 (May 1989). The operation of an Erbium-doped silica fiber as a superfluorescent source at 1535 nm and pumped at 980 nm is also reported in an article by P. R. Morkel, "Erbium-Doped Fibre Superluminescent Source for the Fibre Gyroscope," *Springer Proceedings in Physics*, Volume 44, in *Optical Fiber Sensors*, Springer-Verlag Berlin, Heidelberg 1989. This article analyzes the variation of superfluorescent output power with the pump power and the fiber length and observes the dependence of the spectrum of the superfluorescent emission on fibre length, pump power and fiber temperature.

Neodymium:silica can be modelled as a four-level system, whereas Er:silica is more accurately modelled as a three-level system. The three-level transition of Er:silica is considerably more complex than the four-level transition corresponding to Neodymium. In Erbium, the ground state and the lower laser state are combined into a single state. Hence, both the upper and lower laser levels remain occupied according to Boltzman statistics. Signal emission and signal absorption are both possible. These two processes are often separated by defining separate emission and absorption cross-sections which are weighted by the probabilities of occupation of the levels acting in each case. Emission occurs from the occupied lower levels of the upper laser state to the lower laser state while absorption occurs from the occupied lower levels of the lower laser state to the upper laser state. A plot of the emission cross-section is therefore shifted to lower frequencies (longer wavelengths) than the absorption cross-section.

Nonlinear Optical Applications of Doped Fibers

In addition to their potential as sources and amplifiers, doped fibers appear to be an interesting medium for a whole class of new active devices based on nonlinear optics.

Optical Switches

All-fiber switches with millisecond to sub-picosecond response times are needed for numerous applications, including local area networks, sensor arrays and telecommunication systems. Much of the research in this area has focused on high-speed devices. An article by H. G. Park et al, "Optical Kerr switch using elliptical core two-mode fiber," *Optical Letters*, Volume 13, No. 9, 776-778, September 1988, has reported a nanosecond switch in a pure silica fiber. However, because of the weak optical nonlinearity of silica, it requires a large pump power and long length. Semiconductor-doped glasses, which exhibit considerably larger nonlinearities, have produced picosecond responses in fiber devices, as shown by D. Cotter et al, "Picosecond pump-probe interferometric measurement of optical nonlinearity in semiconductor-doped fibers," *Optical Letters*, 14, 6, 317-319, March 1989. Semiconductor-doped glasses have also produced responses in waveguide devices, as demonstrated in N. Finlayson et al. "Picosecond switching induced by saturable absorption in a nonlinear directional coupler," *Applied Physics Letters*, 53, 13, 1144-1146, September 1988. In both cases, these glasses still require high pump powers and introduce substantial absorption loss of the signal.

There is therefore still a need for a practical compact and reliable nonlinear optical coupler with a low power requirement for the pump source and a low signal absorption loss.

SUMMARY OF THE INVENTION

According to a first aspect of the present invention, there is disclosed an apparatus for controlling an optical signal, comprising an optical waveguide doped with an active medium, the waveguide having first and second spatial propagation modes, the first and second modes having first and second indices of refraction, respectively; and a pump source coupled to introduce a pump signal into at least one of the spatial modes to optically perturb at least one of the first and second indices of refraction, the pump signal controllably varying the spatial intensity distribution of the optical signal.

The second spatial mode is preferably a higher order mode than the first spatial mode. The optical waveguide may have a non-circular cross section having cross-sectional dimensions selected such that the waveguide guides light in the higher order mode in only a single stable intensity pattern.

The perturbation of at least one of the effective refractive indices may phase shift an optical signal component propagating in one of the first and second modes. The pump source has a power and may vary the intensity of the pump signal to vary the phase shift, which can be approximately $\pi$.

The pump signal phase preferably switches the optical energy of the optical signal from the first mode to the second mode and reciprocally.

The pump signal has a pump power that may be greater than $P_{abs}/(1-\exp(\sigma_p N_0 L + P_{abs}/AI_{p,sat}))$, wherein $P_{abs}$ is given by Equation (24), $\sigma_p$ is the absorption cross section for the pump source, $N_0$ is the total species population density for the active medium, L is the length of the optical waveguide, A is the area of the optical waveguide illuminated by the pump signal, and $I_{p,sat}$ is given by Equation (13). The length of the optical waveguide is preferably greater than $L_{min}$ given by Equation (27).

The optical waveguide preferably has an optical intensity distribution pattern caused by the phase relationship between light propagating in the first and second modes, the optical intensity distribution pattern having at least two lobes.

The active medium is preferably a rare earth, such as Erbium. It may also be a semiconductor material.

The optical signal has a first wavelength and the pump signal has a second wavelength. The second wavelength is preferably proximate to an absorption transition of the active medium. The first wavelength may be proximate to a further absorption transition of the active medium, thereby reducing the power of the pump source and increasing the loss of the optical signal for a specified phase shift. The absorption transition and the further absorption transition may be the same. The first wavelength may also be selected away from a further absorption transition of the active medium, thereby increasing the power of the pump source and reducing the loss of the optical signal for a specified phase shift.

The optical waveguide preferably comprises silica. The active medium preferably has high solubility limits in silica. The optical waveguide may be an Erbium-doped silica optical fiber.

The optical signal may undergo a signal loss in the optical waveguide, the signal loss being given by Equation (21).

The active medium has an oscillator strength. The oscillator strength is preferably greater or equal to one.

According to a second aspect of the invention, there is disclosed an apparatus for controlling an optical signal, comprising an optical waveguide doped with an active medium comprising a light propagation medium that supports at least first and second spatial propagation modes, the optical waveguide having a first effective refractive index for light propagating in the first spatial propagation mode and a second effective refractive index, the second effective refractive index different from the first effective refractive index, for light propagating in the second spatial propagation mode so that light propagating in one of the modes propagates at a phase propagation velocity that is different from the phase propagation velocity of light propagating in the other of the modes; an optical signal source that supplies a first optical input signal to the optical waveguide at a first optical wavelength, the first optical wavelength selected so that the first optical input signal has a first spatial mode component that propagates in the optical waveguide in the first spatial propagation mode and a second spatial mode component that propagates in the second spatial propagation mode, the first spatial mode component being shifted in phase with respect to the second spatial mode component as the first optical input signal propagates in the optical waveguide; and a pump source that supplies a second optical input signal to the optical waveguide at a second optical wavelength, the second optical wavelength selected so that the second optical input signal propagates in the optical waveguide in at least the first spatial propagation mode, the second optical input signal having an intensity that is selectable to perturb the first effective refractive index relative to the second effective refractive index to change the amount by which the first spatial propagation mode component of the first optical input signal is shifted in phase with respect to the second spatial mode component of the first optical input signal as the first and second spatial propagation mode components propagate in the optical waveguide.

The active medium is preferably a rare earth, such as Erbium. The active medium may also be a semiconductor material. The first wavelength may be less than the second wavelength. The first wavelength may be proximate to a first absorption resonance of the active medium and the second wavelength may be proximate to a second absorption resonance of the active medium. The first wavelength is, for example, approximately 906 nm, and the second wavelength is, for example, approximately 1.48 μm.

The first spatial propagation mode is preferably the fundamental $LP_{01}$ propagation mode and wherein the second spatial propagation mode is the second-order $LP_{11}$ propagation mode. The optical waveguide may be a two-mode optical fiber having an elliptical core.

In a preferred embodiment of the present invention, the optical waveguide is a two-mode optical fiber; the first spatial mode of the waveguide is the fundamental $LP_{01}$ spatial propagation mode of the optical fiber and the second spatial mode of the waveguide is the second-order $LP_{11}$ spatial propagation mode of the optical fiber; substantially all the light of the second optical input signal propagates in the fundamental $LP_{01}$ spatial propagation mode of the optical fiber; and the light of the first optical signal propagates substantially equally in the fundamental $LP_{01}$ spatial propagation mode and the second-order $LP_{11}$ propagation mode of the optical fiber.

The phase relationship between the first spatial mode component and the second spatial mode component of the first optical input signal may produce an intensity distribution pattern having at least first and second lobes, the intensity of the light in the first and second lobes at the first wavelength varying in accordance with the phase relationship between the first spatial mode component and the second spatial mode component. The apparatus of the present invention may further include means for detecting the intensity of the light in one of the first and second lobes at the first wavelength, the intensity varying in accordance with the intensity of the second optical input signal. The means for detecting light in the one of the first and second lobes at the first wavelength preferably includes an optical detector.

The optical waveguide preferably has a length between an input end and an output end that is selected so that at the output end the first spatial mode component and the second spatial mode component of the first optical input signal have a relative phase difference of $N\pi$, for N equal to an integer (0, 1, 2, 3, ... ), such that substantially all of the light intensity at the first wavelength is concentrated in a first lobe of an optical intensity distribution pattern at the output end when the second input signal has a first low intensity and such that light intensity in the first lobe decreases when the intensity of the second input signal increases.

The apparatus of the present invention may further include means for detecting the intensity of the light in a selected one of the first and second lobes.

According to a third aspect of the present invention, there is disclosed a method of controlling an optical signal in an optical waveguide, comprising the steps of providing an optical waveguide doped with an active medium having a geometry selected so that the optical waveguide supports at least first and second spatial propagation modes light propagating therein, the first and second spatial propagation modes having first and second effective refractive indices, respectively, such that light propagating in one of the first and second spatial propagation modes propagates at a phase velocity that is different from the phase propagation velocity of light propagating in the other of the first and second spatial propagation modes; inputting a first optical signal having a first wavelength into the optical waveguide so that the first optical signal propagates in the optical waveguide with substantially equal light intensities in the first and second spatial propagation modes in the waveguide, the light propagating in the first spatial propagation mode propagating at a phase velocity that is different from the phase propagation velocity of the light propagating in the second spatial propagation mode thereby causing an optical phase difference between the light propagating in the first spatial propagation mode and the light propagating in the second spatial propagation mode, the optical phase difference varying along the length of the optical waveguide; inputting a second optical signal having a second wavelength into the optical waveguide to control the first optical signal, the second optical signal propagating in the optical waveguide in the first spatial propagation mode; and selectively adjusting the intensity of the second optical signal so that the second optical signal has an intensity sufficiently large to perturb the first effective refractive index with respect to the second effective refractive index to change the phase velocity of the light of the first optical signal propagating in the first spatial propagation mode, thereby introducing an additional optical phase difference between the light propagating in the first spatial propagation mode and the light propagating in the second spatial propagation mode, the additional optical phase difference causing a change in the intensities in first and second lobes of an optical intensity distribution pattern at the output of the optical waveguide.

The method of the present invention preferably comprises the step of detecting the change in the intensities of the first and second lobes of the optical intensity distribution pattern in the output of the optical waveguide. The step of detecting the change in the intensity may comprise the step of directing the light from the first and second lobes of the optical intensity distribution pattern toward an optical detector.

The method of the present invention may further comprise the step of adjusting the length of the optical waveguide prior to the step of inputting the second optical signal into the optical waveguide so that substantially all of the light intensity is initially in one of the first and second lobes of the optical intensity distribution pattern. The step of selectively adjusting the intensity of the second optical signal may comprise the step of selecting an intensity of the second optical signal wherein substantially all of the light intensity at the first wavelength is in the other of the first and second lobes of the optical intensity distribution pattern.

According to a further aspect of the present invention, there is disclosed an optical mode coupling apparatus comprising an optical waveguide doped with an active medium, the apparatus coupling an optical signal propagating in the optical waveguide between propagation modes of the waveguide, the optical signal having an optical signal beat length for the modes, the waveguide comprising a guiding structure formed of materials having dissimilar indices of refraction and having perturbations being spaced at intervals related to the beat length of the optical signal to cause cumulative coupling of the optical signal from one of the propagation modes to another.

The optical waveguide may have a non-circular cross section having cross-sectional dimensions selected such that the waveguide guides a portion of the perturbational signal in a fundamental spatial mode and another portion in a higher order spatial mode, the cross-sectional dimensions of the waveguide being further selected such that the perturbational signal guided by the waveguide in the higher mode propagates in only a single, stable intensity pattern. The fundamental spatial mode may include two polarization modes, the cross-sectional dimensions of the core being further selected to cause the polarization modes of the fundamental mode to be non-degenerate.

The single intensity pattern of the higher order spatial mode may include two polarization modes, the cross-sectional dimensions of the core being further selected to cause these polarization modes to be non-degenerate.

The core of the waveguide may have an elliptical cross section. The refractive index perturbations of the waveguide are preferably produced by the optical Kerr effect. The propagation modes are preferably first and second order spatial modes of the waveguide. The waveguide preferably has a non-circular cross section.

According to a further aspect of the present invention, there is disclosed a method of controlling an optical signal in an optical waveguide, comprising the steps of providing an optical waveguide doped with an active medium, the optical waveguide having least first and second spatial propagation modes, the first and second spatial propagation modes having first and second refractive indices, respectively; inputting the optical signal having a first wavelength into the optical waveguide; inputting a pump signal having a second wavelength into the optical waveguide to optically perturb at least one of the first and second indices of refraction; selectively adjusting the intensity of the pump signal to controllably vary the spatial intensity distribution of the optical signal.

The method of the present invention may further comprise the step of selecting the active medium so that the active medium has a high oscillator strength. It may further comprise the step of selecting the second wavelength to be proximate to an absorption transition of the active medium.

The method of the present invention may comprise the step of selecting the first wavelength to be proximate to an absorption transition of the active medium or to be away from an absorption transition of the active medium. It may further comprise the step of selecting the first and second wavelength to be proximate to the same absorption transition of the active medium. It may comprise the step of selecting the second wavelength to be proximate to an absorption transition of the active medium and further comprising the step of selecting the first wavelength to be away from the absorption transition.

The method of the present invention may comprise the step of phase shifting the optical signal component propagating in one of the first and second modes. The optical signal may experience a loss during its propagation in the optical waveguide. The pump source has a power and the perturbation of at least one of the refractive indices may phase shift a component of the optical signal in one of the first and second modes. The method may further comprise the step of selecting the first wavelength so as to minimize the loss of the optical signal and so as to minimize the power of the pump source for a specified phase shift, the pump power being reduced and the signal loss being increased when the first wavelength is proximate to an absorption transition of the active medium, and, reciprocally, the pump power being increased and the signal loss being reduced when the first wavelength is selected away from an absorption transition of the active medium.

The optical waveguide has a length and the pump source has a power. The perturbation of the at least one of the refractive indices may phase shift a component of the optical signal in one of the first and second modes. The method may further comprise the step of selecting the length of the optical waveguide and the power of the pump source so as to minimize both the length of the optical waveguide and the power of the pump source for a specified phase shift, the minimum length verifying Equation (27) and the minimum power verifying Equation (26).

BRIEF DESCRIPTION OF THE DRAWINGS

FIGS. 3a and 3b illustrate the $LP_{01}$ approximations for the first-order propagation modes of the optical fiber of FIG. 1.

FIGS. 3c, 3d, 3e and 3f illustrate the $LP_{11}$ approximations for the second-order propagation modes of the optical fiber of FIG. 1.

FIG. 4 is an unscaled graph of the propagation constant of an optical waveguide versus the ellipticity of the core of the optical waveguide.

FIG. 5 is a cross-sectional view of an exemplary elliptical core.

FIGS. 6a and 6b illustrate the electric field intensity patterns for the $LP_{01}$ (fundamental) propagation modes of the elliptical core optical fiber of FIG. 5.

FIG. 6c is a graph of the electric field amplitude distribution for the $LP_{01}$ propagation mode of the elliptical core optical fiber of FIG. 5.

FIGS. 6d and 6e illustrate the electric field intensity patterns for the even $LP_{11}$ propagation modes of the elliptical core optical fiber of FIG. 5.

FIG. 6f is a graph of the electric field amplitude distribution for the even $LP_{11}$ propagation modes of the elliptical core optical fiber of FIG. 5.

FIGS. 6g and 6h illustrate the electric field intensity patterns for the odd $LP_{11}$ propagation modes of the elliptical core optical fiber of FIG. 5.

FIGS. 11a–11i illustrate cross sections of the electrical field intensity patterns taken at locations 11a–11a, 11b–11b, etc. in FIG. 12.

FIG. 12 illustrates a portion of the optical fiber from the optical coupler of FIG. 7.

DETAILED DESCRIPTION OF THE PREFERRED EMBODIMENTS

Figure 1:
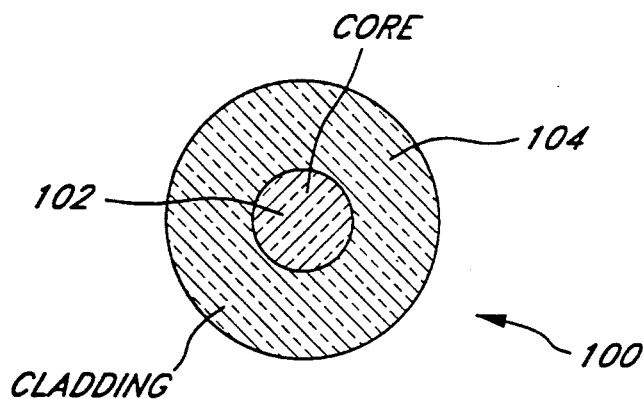
FIG. 1 is a cross-sectional view of an exemplary circular core optical fiber.

The present invention comprises an optical waveguide that preferably operates at a wavelength below cutoff such that the waveguide supports both fundamental and second-order guided modes. The fundamental and second-order guided modes provide two substantially independent paths through the optical waveguide which permits the device to be used as a two-channel optical propagation medium. The embodiments of the present invention preferably use an optical waveguide having the geometry of the core selected so that only one stable spatial orientation of the second-order mode is supported in the waveguide. The optical waveguide comprises an active material, and in the preferred embodiment comprises a doped optical fiber.

General Principle of the Present Invention

The nonlinear optical coupler of the present invention uses the principle that optical nonlinearities can be considerably enhanced near an absorption resonance, as shown in R. H. Pantell et al., *Fundamentals of Quantum Electronics*, Chapters 2 and 5, Wiley, New York, 1969. Rare earth doped fibers offer numerous absorption transitions and are preferably used in the preferred embodiment of the present invention. The nonlinear coupler of the present invention preferably uses a short length of doped fiber into which a probe signal and a pump signal are simultaneously injected. As the pump signal excites electrons to some excited state, it changes the electronic distribution, which modifies the refractive index of the guiding region for signal wavelengths near an absorption resonance of the dopant. This index change is small, but in a long enough fiber, it can produce a substantial phase shift even with a low pump power in the amount of some milliwatts.

Thus, the nonlinear optical coupler of the present invention preferably uses a pump signal of which the wavelength is centered proximate to a resonant transition in an optical waveguide to modify the phase shift experienced by an optical probe signal. Resonance is a wavelength at which there is a peak in the absorption emission of the material. Resonance will be described as a resonant electronic transition. The spectrum of an active medium can comprise several resonant transitions. As will be described below, the probe signal may be centered proximate to a resonant transition of the active medium of the optical waveguide, but may also be detuned from the resonant transition. The coupler of the present invention uses a low pump power and substantially reduces the absorption at the signal wavelength.

The principle behind the present invention resides in that, when exciting a transition near resonance, the electronic distribution changes as well as the contribution of this transition to the refractive index of the material. As mentioned above, this effect exists in pure silica but is extremely weak, and in undoped, pure silica fibers, a high pump power (on the order of tens of watts) and a long fiber (on the order of tens of meters) are required to induce the phase shift of $\pi$ needed for switching. In the present invention, the nonlinear coefficient is considerably enhanced near a resonance. See for example A. M. Glass, "Materials for optical information processing," *Science*, 226, 657–662 (1984); D. F. Eaton, "Nonlinear optical materials," *Science*, 253, 281–2871, (1991); and G. I. Stegeman et al., "Third order nonlinear integrated optics," *Journal of Lightwave Technology*, 6, 953–970 (1988). The pump wavelength is selected to lie close to an absorption resonance of the dopant, so that, as it travels down the fiber, it is gradually absorbed. In the process, it excites electrons from the ground state of the dopant to some excited state, thereby modifying the electronic contribution of this transition and the refractive index of the material. For a lower intensity signal, the $\chi$ contribution from a single transition is identical to the nonlinear effect that results from a redistribution of electron population. See D. F. Eaton, "Nonlinear optical materials," *Science*, 253, 281–287 (1991).

The present invention preferably uses an optical fiber doped with an appropriate impurity excited optically near an absorption resonance of this impurity to produce strongly enhanced nonlinear susceptibilities. Modeling shows that it is then possible to reduce the pump and length requirements by several orders of magnitude each, and to produce a $\pi$ phase shift in centimeter lengths with a very low pump power (in the amount of a few milliwatts).

This nonlinearity effect was first modelled in Er-doped fiber amplifiers as in E. Desurvire, "Study of the complex atomic susceptibility of erbium-doped fiber amplifier," *Journal of Lightwave Technology*, 8, 10, 1517–1527, October 1990.

The optical coupler of the present invention preferably comprises a two-mode fiber interferometer made of an Er-doped fiber, pumped by a 1.48 μm laser diode. Two-mode fiber interferometers are described in the Park reference mentioned above and in B. Y. Kim et al., "Use of highly elliptical core fibers for two-mode fiber devices," *Optical Letters*, 12, 9, 7290731, September 1987. By proper selection of the signal wavelength, the signal loss can be negligible while retaining the advantage of enhanced nonlinearity.

The nonlinear coefficient and the induced phase shift experienced by the signal depend upon the proximity of the signal frequency to the transition frequency of the dopant. The closer to resonance, the stronger the nonlinear effect, but also the stronger is the absorption of the signal. Thus, there is a trade-off between how much power is required to produce the phase shift and how much loss the signal suffers.

Before discussing the specific embodiments of the present invention, a summary of the applicable mode theory will be presented to provide a more complete understanding of the invention. Although described below in connection with a silica glass optical fiber, one skilled in the art will understand that the concepts presented are also applicable to other optical waveguides, such as a LiNbO$_3$ optical fiber, integrated optics, semiconductor waveguides, or the like. The mode theory will be given in connection with an undoped silica glass optical fiber, as it will facilitate the understanding of mode propagation. Whether an optical fiber is doped or undoped has no bearing on the basic concepts of mode propagation. Further details regarding mode theory can be found in U.S. Pat. No. 4,895,421, assigned to the assignee of this application. This patent is hereby incorporated by reference herein.

Mode Theory

An exemplary cross section of a silica glass optical fiber 100 is illustrated in FIG. 1. The fiber 100 comprises an inner core 102 and an outer cladding 104. The inner core 102 has a radius of r. In the exemplary fiber 100, the core has a refractive index $n_{co}$ and the cladding has a refractive index $n_{cl}$. As is well known in the art, the core refractive index $n_{co}$ is greater than the cladding index $n_{cl}$ so that an optical signal propagating in the optical fiber 100 is well-guided. The number of modes guided by the optical fiber 100 depends upon the fiber geometry and upon the wavelength of the optical signal propagating therethrough. Typically, the wavelength above which an optical fiber will propagate only the fundamental or first-order mode is referred to as the "second-order mode cutoff" wavelength $\lambda_c$, which may be calculated for a circular core fiber utilizing the following equation:

$$\lambda_c = \frac{2\pi r \sqrt{n_{co}^2 - n_{cl}^2}}{2.405}$$

If the wavelength of the optical signal is greater than the wavelength $\lambda_c$ (i.e., the frequency of the optical signal is less than a cutoff frequency), only the first-order or fundamental propagation mode of the optical signal will be well-guided by the fiber and will be propagated by the fiber. If the wavelength of an optical signal is less than $\lambda_c$ (i.e., the frequency of the optical signal is greater than the cutoff frequency), higher order modes, such as the second-order modes, will begin to propagate.

The true first-order and second-order modes of a circular core optical fiber and their respective electric field amplitude distributions are illustrated in FIGS. 2a-2h. The two first-order modes are the vertically polarized HE$_{11}$ mode represented by an electric field pattern 10 in FIG. 2a, and the horizontally polarized HE$_{11}$ mode, represented by an electric field pattern 112 in FIG. 2b. The outer circle in each figure represents the boundary of the core 102 of the fiber 100 of FIG. 1.

Figure 2A:
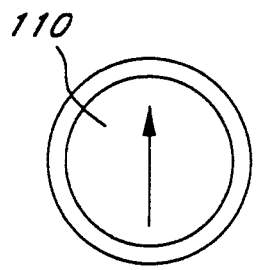
FIGS. 2a and 2b illustrate the electric field intensity distribution patterns for the vertically polarized and horizontally polarized $HE_{11}$ (fundamental) propagation modes of the circular core optical fiber of FIG. 1.
Figure 2B:
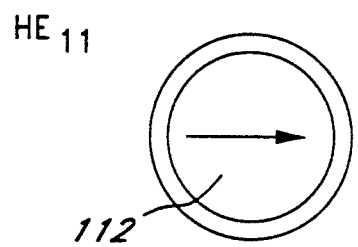
Figure 2C:
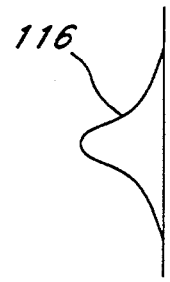
FIG. 2c is a graph of the electric field amplitude distribution corresponding to the intensity distribution patterns of FIGS. 2a and 2b.
Figure 2D:
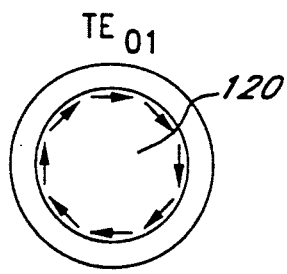
FIGS. 2d, 2e, 2f and 2g illustrate the electric field intensity distribution patterns for the $TE_{01}$, $TM_{01}$, even $HE_{21}$ and odd $HE_{21}$ (second-order) propagation modes, respectively, of the circular core optical fiber of FIG. 1.
Figure 2E:
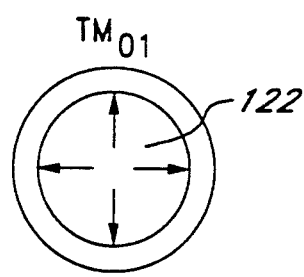
Figure 2F:
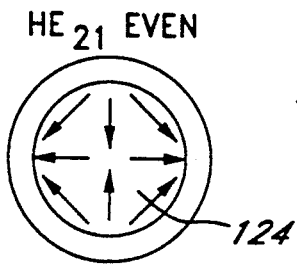
Figure 2G:
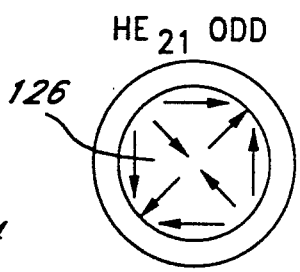

As illustrated in FIG. 2c, the LP$_{01}$ modes have an electric field amplitude distribution 116 that is substantially symmetrical around the centerline of the core 102. The electric field amplitude distribution 116 is concentrated in the center of the core 102 and decreases as the distance from the center of the core 102 increases. A small portion of the electric field amplitude distribution 116 often extends beyond the boundaries of the core. This extended electric field is commonly referred to as the evanescent field of the guided modes.

The four true second-order modes are illustrated in FIGS. 2d-2g. These four true modes are distinguished by the orientation of the transverse electric field, denoted by the directions of the arrows in FIGS. 2d-2g, and are commonly referred to as the TE$_{01}$ mode, represented by an electric field pattern 120 in FIG. 2d; the TM$_{01}$ mode, represented by an electric field pattern 122 in FIG. 2e; the HE$_{21}$ even mode, represented by an electric field pattern 124 in FIG. 2f; and the HE$_{21}$ odd mode, represented by an electric field pattern 126 in FIG. 2g.

Figure 2H:
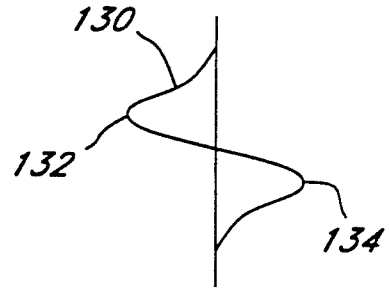
FIG. 2h is a graph of the electric field amplitude distribution patterns for the second-order modes of the optical fiber of FIG. 1.

An electric field amplitude distribution 130 for an exemplary optical signal propagating in the second-order modes is illustrated in FIG. 2h. As illustrated, the electric field amplitude distribution 130 is substantially equal to zero at the centerline of the core, and has two maximum amplitudes 132 and 134 near the boundary of the core. As further illustrated, the two amplitude maxima 132 and 134 are 180° out of phase. Further, a greater portion of the electric field distribution extends beyond the boundary of the core in the second-order modes, thus providing a larger evanescent field than for the HE$_{11}$ modes.

Each of the four true second-order modes has a slightly different propagation velocity from the other of the four second-order modes. Thus, when one or more of the true second-order modes are co-propagating in a two-mode fiber, the intensity distribution of the second-order mode varies as a function of the length of the fiber as a result of changes in the phase differences between the four modes as they propagate. The cross-sectional intensity distribution of the second-order mode changes in response to environmental changes that induce differential phase shifts between the almost degenerate four modes.

In order to more easily analyze the characteristics of optical signals propagating in the second-order propagation modes, the characteristics of the modes are analyzed using the LP approximations for the modes defined and described in detail in D. Gloge, "Weakly Guiding Fibers," *Applied Optics*, Vol. 10, No. 10, October 1971, pp. 2252-2258.

A better understanding of the mode theory of optical propagation in an optical fiber or other circular core waveguide can be obtained by referring to FIGS. 3a-3f, and wherein the first and second modes are represented in accordance with the LP approximations described by Gloge in his paper. The outer circles in each of the illustrations again represent the cross section of the core 102 of the optical fiber 100 of FIG. 1. The outlines within the core circles represent the electric field distributions. Arrows with the inner outlines represent the direction of polarization.

FIGS. 3a-3b show the field patterns of the two polarization modes in the fundamental LP$_{01}$ set of modes. A field pattern 140 in FIG. 3a represents vertically polarized light in the LP$_{01}$ fundamental mode, and a field pattern 142 in FIG. 3b represents horizontally polarized light in the fundamental LP$_{01}$ mode.

FIGS. 3c-3f illustrate the LP$_{11}$ approximations for the second-order modes. As illustrated in FIGS. 3c-3f, there are four LP$_{11}$ modes, each having two lobes for the electric field distribution. Two of the modes, represented by an LP$_{11}$ mode pattern 150 in FIG. 3c and an LP$_{11}$ mode pattern 152 in FIG. 3d, are referred to herein as the LP$_{11}$ even modes. The other two LP$_{11}$ modes, represented by an LP$_{11}$ mode pattern 154 in FIG. 3e and an LP$_{11}$ mode pattern 156 in FIG. 3f, are referred to as the LP$_{11}$ odd modes. The four LP$_{11}$ modes are distinguished by the orientation of the lobe patterns and the orientation of the electric field vectors (i.e., the polarization vectors) within the lobe patterns. For example, the first $LP_{11}$ even mode field pattern 150 (FIG. 3c) has two lobes that are symmetrically located about a horizontal zero electric field line 160. Within the two lobes, the electric field vectors are parallel to and anti-symmetric about the zero electric field line 160. For convenience, the $LP_{11}$ mode represented by the lobe pattern 150 will be referred to as the horizontally polarized $LP_{11}$ even mode.

The second $LP_{11}$ even lobe pattern 152 (FIG. 3d) is symmetrically located about a horizontal zero electric field line 142. Within the two lobes of the field pattern 152, the electric field vectors are perpendicular to and anti-symmetric about the zero electric field line 162. The $LP_{11}$ mode represented by the electric field pattern 152 will be referred to as the vertically polarized $LP_{11}$ even mode.

The first $LP_{11}$ odd mode field pattern 154 has two lobes that are symmetrically located about a vertically oriented zero electric field line 164. Within the two lobes, the electric field vector is perpendicular to and anti-symmetric about the zero electric field line 164, and are thus oriented horizontally. The $LP_{11}$ mode represented by the field pattern 154 will thus be referred to as the horizontally polarized $LP_{11}$ odd mode.

The electric field pattern 156 of the second $LP_{11}$ odd mode has two lobes that are symmetrically located about a vertically oriented zero electric field line 166. Within the two lobes, the electric field vectors are parallel to and anti-symmetric about the zero electric field line 166. Thus, the $LP_{11}$ mode represented by the electric field pattern 156 will be referred to as the vertically polarized $LP_{11}$ odd mode.

In the LP-mode approximations, each of the six electric field patterns in FIGS. 3a–3f, namely the two $LP_{01}$ patterns and the four $LP_{11}$ patterns, are orthogonal to each other. In other words, in the absence of perturbations to the optical waveguide, there is substantially no coupling of optical energy from one of the field patterns to any of the other field patterns. Thus, the six electric field patterns may be viewed as independent optical paths through the optical waveguide, which ordinarily do not couple with each other.

If the indices of the core 102 and the cladding 104 of the optical fiber 100 are approximately equal, the two $LP_{01}$ modes will travel through the fiber at approximately the same propagation velocity, and the four second-order $LP_{11}$ modes will travel through the fiber at approximately the same propagation velocity. However, the propagation velocity for the fundamental $LP_{01}$ set of modes will be slower than the propagation velocity for the second-order $LP_{11}$ set of modes. Thus, the two sets of modes, $LP_{01}$ and $LP_{11}$, will move in and out of phase with each other as the light propagates through the fiber. The propagation distance required for the two sets of modes to move out of phase by 360° (i.e., $2\pi$ radians) is commonly referred to as the beat length of the fiber, which may be mathematically expressed as:

$$L_B = \frac{\lambda}{\Delta n} = \frac{2\pi}{\Delta \beta} \qquad (b)$$

where $L_B$ is the beat length, $\lambda$ is the optical wavelength in a vacuum, $\Delta n$ is the difference in the effective refractive indices of the two sets of modes, and $\Delta \beta$ is the difference in the propagation constants for the two sets of modes.

It has been previously shown that coherent power transfer between the two sets of the modes, $LP_{01}$ and $LP_{11}$, can be achieved by producing periodic perturbations in the optical fiber that match the beat length of the two modes. A number of optical devices have been constructed to control the coupling of optical energy between the two modes to provide useful devices for selective coupling, filtering and frequency shifting of an optical signal. See, for example, W. V. Sorin, et al., "Highly selective evanescent modal filter for two-mode optical fibers," *OPTICS LETTERS*, Vol. 11, No. 9, September 1986, pp. 581–583; R. C. Youngquist, et al., "All-fibre components using periodic coupling," *IEEE Proceedings*, Vol. 132, Pt. J, No. 5, October 1985, pp. 277–286; R. C. Youngquist, et al., "Two-mode fiber modal coupler," *OPTICS LETTERS*, Vol. 9, No. 5, May 1984, pp. 177–179; J. N. Blake, et al., "Fiber-optic modal coupler using periodic microbending," *OPTICS LETTERS*, Vol. 11, No. 3, March 1986, pp. 177–179; B. Y. Kim, et al., "All-fiber acousto-optic frequency shifter," *OPTICS. LETTERS*, Vol. 11, No. 6, June 1986, pp. 389–391; and J. N. Blake, et al., "All-fiber acousto-optic frequency shifter using two-mode fiber," *Proceedings of the SPIE*, Vol. 719, 1986. The present invention provides substantial improvement to many of those devices and provides a number of new devices that utilize coupling between the modes to further control an optical signal.

Although the four $LP_{11}$ modes provide four orthogonal channels for the propagation of optical energy through an optical fiber or other waveguide, it has often been found to be difficult to fully utilize the four channels independently. As set forth above, the $LP_{11}$ modes are approximations of real modes and are nearly degenerate in a circular core fiber 100. This makes the $LP_{11}$ modes very sensitive to couplings caused by perturbations in the optical fiber, such as bending, twisting and lateral stressing. Furthermore, since the $LP_{11}$ modes are only an approximation of the real modes, there will be a slight amount of coupling even in the absence of perturbations of the fiber 100. The net result is that the propagation of an $LP_{11}$ mode electric field pattern in a given mode is not stable. In like manner, the electric field patterns of the two $LP_{01}$ polarization modes are likewise unstable.

It has been previously shown that the use of an elliptical core cross section in an optical fiber or other waveguide can introduce birefringence and separate the propagation constants for the two polarizations of the $LP_{01}$ first-order mode. The separation of the propagation constants locks the polarization of the signal to a principle axis of the core cross section. It has also been shown that an elliptical core also increases the separation between the propagation constants of the $LP_{11}$ mode patterns. This tends to enhance modal stability. This is illustrated in FIG. 4 which is an unscaled representation of the propagation constant $\beta$ versus the ellipticity of the core of an optical waveguide. As illustrated, the $LP_{01}$ propagation mode has a larger propagation constant than the $LP_{11}$ propagation mode. From Equation (b), this difference in the propagation constants is related to the beat length $L_B$ between the $LP_{01}$ and $LP_{11}$ propagation modes as follows:

$$\Delta \beta_{01} = \frac{2\pi}{L_{B01}} \qquad (c)$$

where $\Delta\beta_{01}$ is the difference in the propagation constants between the LP$_{01}$ mode and the LP$_{11}$ mode, and L$_{B01}$O, is the beat length between the LP$_{01}$ and LP$_{11}$ modes.

As illustrated in the left-hand portion of FIG. 4, when the core of the optical waveguide is substantially circular, the LP$_{11}$ odd and even modes have substantially the same propagation constant. However, when the core of the optical waveguide is elliptical, the propagation constants of the odd and even LP$_{11}$ modes are different. This is illustrated by the propagation constant difference $\Delta\beta_{11}$ in the right half of FIG. 4. As illustrated, the difference in the propagation constants of the odd and even LP$_{11}$ modes ($\Delta\beta_{11}$) increases as the ellipticity increases. The use of an elliptical core optical fiber has been suggested as a means of avoiding the degeneracy of the orthogonal lobe orientations of the LP$_{11}$ modes. See, for example, J. N. Blake, et al., "All-fiber acousto-optic frequency shifter using two-mode fiber," *Proceedings of the SPIE*, Vol. 719, 1986.

The foregoing differences in the propagation constants between the LP$_{01}$ mode and the odd and even LP$_{11}$ modes when the core of the optical fiber is elliptical, also results in a change in the cutoff wavelength and the corresponding cutoff frequency. For example, for a circular core optical fiber, the cutoff wavelength is related to the radius of the fiber core, as set forth in Equation (a) above. Thus, optical signals having wavelengths above the second-order mode cutoff wavelength $\lambda_c$ (i.e., frequencies below the second-order mode cutoff frequency) will not propagate in the second-order or higher modes in the optical fiber. Optical signals having wavelengths less than the cutoff wavelength $\lambda_c$ will propagate in the second-order modes. If the wavelength is further reduced to a wavelength $\lambda_{c2}$, third-order and higher modes will be supported by the optical waveguide. For a circular core optical waveguide, $\lambda_{c2}$ can be found by the following equation:

$$\lambda_{c2} = \frac{2\pi r \sqrt{n_{co}^2 - n_{cl}^2}}{3.832} \quad (d)$$

where r, $n_{co}$ and $n_{cl}$ are as set forth above for Equation (a). One skilled in the art will understand that the foregoing can also be represented by cutoff frequencies. For example, the first cutoff wavelength $\lambda_c$ corresponds to a first cutoff frequency $f_c$, and the second cutoff wavelength $\lambda_{c2}$ corresponds to a second cutoff frequency $f_{c2}$ that is greater than the first cutoff frequency $f_c$. Specifically, for the circular core optical waveguide, if the first cutoff frequency $f_c$ is normalized to 2.405, the second cutoff frequency $f_{c2}$ will be normalized to 3.832. In other words, the second cutoff frequency will be 1.59 times greater than the first cutoff frequency (e.g., $f_{c2}/f_c = 3.832/2.405 = 1.59$). Thus, an optical signal having a normalized frequency less than 2.405 will propagate in the optical waveguide only in the LP$_{01}$ mode. An optical signal having a normalized frequency in the range of 2.405 to 3.832 will also propagate in the second-order LP$_{11}$ mode. An optical signal having a normalized frequency greater than 3.832 will propagate in higher order modes.

The foregoing relationships also apply when the core of the optical waveguide is elliptical or has some other non-circular geometry. For example, Allan W. Snyder and Xue-Heng Zheng, in "Optical Fibers of Arbitrary Cross-Sections," *Journal of the Optical Society of America*, Vol. 3, No. 5, May 1986, pp. 600–609, set forth the normalization factors for a number of different waveguide cross sections. For example, an elliptical core waveguide, having a major axis that is twice the length of the minor axis, will have a normalized cutoff frequency $f_c$ of 1.889 when the minor axis has the same length as the diameter of a corresponding circular core optical fiber of the same material construction. In other words, below the normalized frequency of 1.889, only the first-order LP$_{01}$ modes will propagate. Similarly, Snyder and Zheng suggest that the LP$_{11}$ even mode will have a normalized cutoff frequency of 2.505, and the LP$_{11}$ odd mode will have a normalized cutoff frequency of 3.426.

Snyder and Zheng generalize the foregoing concept for an elliptical core optical waveguide with varying ratios between the length of the minor axis and the length of the major axis as follows:

$$f_c = 1.700(1 + (b/a)^2)^{\frac{1}{178}} \quad (e)$$

$$f_{c2even} = 1.961(1 + 3(b/a)^2)^{\frac{1}{2}} \quad (f)$$

$$f_{c2odd} = 1.916(3 + (b/a)^2)^{\frac{1}{2}} \quad (g)$$

where $f_c$ is the normalized cutoff frequency for the LP$_{01}$ mode, below which optical energy will propagate only in the LP$_{01}$ mode in the elliptical core optical fiber; where $f_{c2even}$ is the normalized cutoff frequency for optical energy propagating in the LP$_{11}$ even mode, below which optical energy will propagate only in the LP$_{11}$ even mode but not in the LP$_{11}$ odd mode; and where $f_{c2odd}$ is the normalized cutoff frequency for the LP$_{11}$ odd mode, below which optical energy will propagate in the LP$_{11}$ odd mode as well as the LP$_{11}$ even mode, but not in any of the higher order modes; b is one-half the length of the minor axis of the elliptical core; and a is one-half the length of the major axis of the elliptical core. Equations (e), (f) and (g) can be evaluated for an elliptical core fiber having a major axis length $2a$ of twice the minor axis length $2b$ to obtain the normalized frequencies 1.889, 2.505 and 3.426, set forth above. Equations (e), (f) and (g) can be further evaluated for $b = a$ (i.e., for a circular core) to obtain the LP$_{01}$ cutoff frequency of 2.405 and the LP$_{11}$ cutoff frequency of 3.832 for both the odd and even modes, as set forth above.

The foregoing properties of the elliptical core optical waveguide can be advantageously utilized in the present invention to improve the operating characteristics of the optical waveguide by eliminating the LP$_{11}$ odd propagation mode and thus provide only one spatial orientation for the electric field pattern of the second-order mode. This is illustrated in FIGS. 5 and 6a-6g.

FIG. 5 illustrates an exemplary optical fiber 200 having an elliptical core 202 and a surrounding cladding 204. The dimensions of the elliptical core 202 are selected so that the cutoff wavelengths and frequencies for the two orthogonal lobe patterns of the second-order mode are well separated. An optical signal is applied to the fiber 200 that is within a frequency range selected to be above the cutoff frequency $f_{c2even}$ and to be below the cutoff frequency $f_{c2odd}$. For example, in an exemplary optical fiber having a first cutoff frequency $f_c$ that is normalized to 1.889, and a second frequency $f_{c2even}$ of 2.505, the frequency of the input optical signal is selected to have a normalized frequency in the range of 1.889 to 2.505. Thus, a light source is selected so that substantially all of the light produced by the light source has a normalized frequency that is substantially less than the second cutoff frequency that is substantially less than the second cutoff frequency $f_{c2even}$, and that has a substantial portion of the light that has a normalized frequency that is greater than the first cutoff frequency $f_c$. In terms of wavelength, substantially all of the light produced by the light source has one or more wavelengths that are greater than the second cutoff wavelength $\lambda_{c2even}$, and wherein a substantial portion of the light has at least one wavelength that is less than the first cutoff wavelength $\lambda_c$. Thus, the light entering the optical fiber is caused to propagate only in either the first-order $LP_{01}$ mode or the $LP_{11}$ even mode. Since the frequency of the optical signal is selected to be less than the cutoff wavelength for the $LP_{11}$ odd mode, substantially no light propagates in the $LP_{11}$ odd mode.

The foregoing is illustrated in FIGS. 6a–6g. In FIGS. 6a and 6b, the two polarization modes for the $LP_{01}$ first-order mode are illustrated. An electric field pattern 210 in FIG. 6a represents the electric field for the vertically polarized $LP_{01}$ mode, and an electric field pattern 212 in FIG. 6b represents the electric field for the horizontally polarized $LP_{01}$ mode. One skilled in the art will understand that the optical fiber 200 (FIG. 5) is birefringent for the first-order $LP_{01}$ mode, and that the horizontally polarized $LP_{01}$ mode will propagate at a greater velocity than the vertically polarized $LP_{01}$ mode. An electric field amplitude distribution 214 for the $LP_{01}$ propagation modes is illustrated in FIG. 6c. As illustrated, the electric field amplitude distribution 214 is similar to the electric field amplitude distribution 116 in FIG. 2b, for a circular core fiber and has a peak amplitude 216 proximate to the centerline of the core 203.

FIGS. 6d and 6e illustrates the $LP_{11}$ even modes for the elliptical core fiber 200. As illustrated in FIGS. 6d and 6e, respectively, a vertically polarized even mode electric field pattern 220 and a horizontally polarized even mode electric field pattern 222 are both well-guided by the optical fiber 200. As illustrated in FIG. 6f, the $LP_{11}$ even modes have an electric field amplitude distribution, represented by a curve 224, that has a first maxima 226 proximate to one boundary of the core, and that has a second maxima 228 proximate to an opposite boundary of the core, and wherein the first maxima 226 and the second maxima 228 are 180° out of phase.

The $LP_{11}$ odd vertical polarization mode, represented by an electric field pattern 230 (FIG. 6f), and the $LP_{11}$ odd horizontal polarization mode, represented by an electric field pattern 232 (FIG. 6g), are not guided by the optical fiber 200 when the optical wavelength is selected to be above the second cutoff wavelength $\lambda_{c2even}$. Thus, the optical energy in the $LP_{11}$ odd modes, represented by the field patterns 230 and 232, will not propagate. Thus, rather than providing four degenerate optical communication channels, such as provided by a circular core waveguide or a slightly elliptical core waveguide, the highly elliptical core 202 of the optical fiber 200 provides only two $LP_{01}$ mode propagation channels and two $LP_{11}$ even mode propagation channels. Furthermore, the communication channels are well-defined and stable, and, in the absence of a perturbation in the optical fiber 200, there is no coupling between any of the four channels. Therefore, an optical signal can be launched in the second-order $LP_{11}$ mode, and it will propagate only in the $LP_{11}$ even mode. It is not necessary to avoid exciting the odd lobe patterns of the second-order $LP_{11}$ mode because optical energy in those lobe patterns will not propagate. Furthermore, optical energy will not be coupled to the odd lobe patterns.

Because of the stability of the electric field intensity patterns of the $LP_{01}$ mode and the $LP_{11}$ even modes, the performances of fiber optic devices previously developed to utilize the second-order $LP_{11}$ mode will be increased. Specific examples of devices utilizing the highly elliptical core waveguide will be set forth hereinafter.

Description of the Nonlinear optical Coupler of the Present Invention

Figure 7:
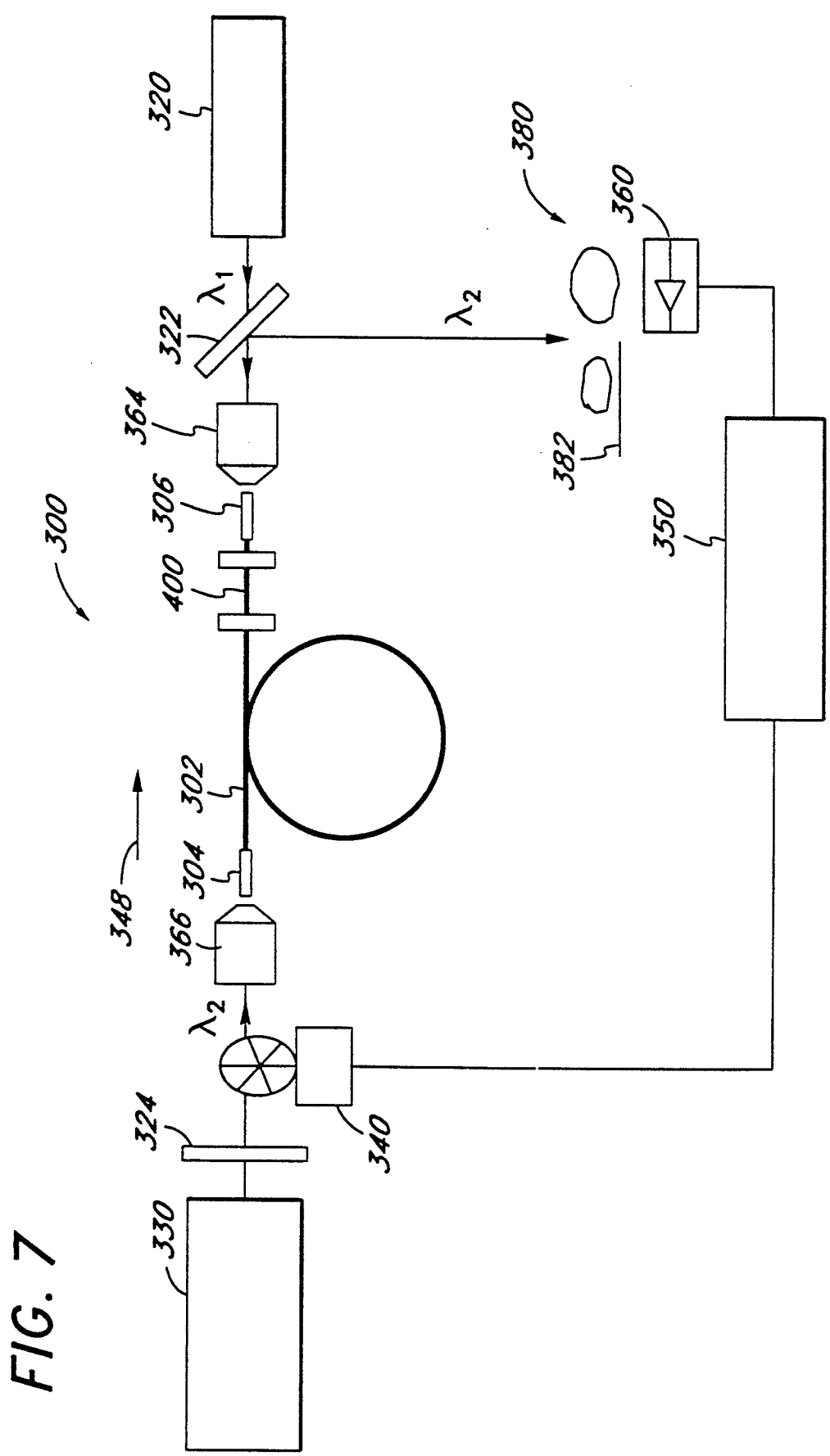
FIG. 7 illustrates an optical coupler constructed in accordance with one aspect of the invention in which light from a pump source and light from a signal source are counterpropagating in an Erbium-doped optical fiber.

An optical device 300 in accordance with the present invention is illustrated in FIG. 7. One of the most interesting applications of the device 300 is its use as an optical switch in an optical signal processing system, an optical communications system, and the like. However, the device 300 can be used for other applications and will be referred to as nonlinear coupler throughout the specification. It will be understood that the nonlinear coupler 300 will act as a switch when the phase shift is specified to have the value $\pi$.

The optical coupler 300 represented in FIG. 7 is of an experimental nature. The person skilled in the art will recognize that an optical coupler for commercial applications may have different optical components and operate at different launching conditions. For example, the optical coupler of the present invention may comprise a polarizer interposed between the signal source and the fiber or between the pump source and the fiber so that the signal emitted by the signal source or the pump signal are polarized before entering the optical fiber.

The optical coupler 300 of FIG. 7 comprises an Erbium-doped optical fiber 302. The optical fiber 302 has a first end portion 304 (also referred to as input portion) and a second end portion 306 (also referred to as output portion). A pump light source 320 is provided that generates an output signal having a wavelength $\lambda_1$. In the embodiment represented in FIG. 7, the pump light source 330 is advantageously positioned proximate to the second end portion 306 of the optical fiber 302. Thus, the pump light source 320 is coupled to the fiber 302 in the backward direction. The pump signal emitted by the pump light source 320 propagates in a backward direction in the optical fiber 302 from the second end portion 306 to the first end portion 304. In the exemplary embodiment illustrated in FIG. 7, a lens 364 (e.g., a 20-power microscope objective, or the like) is interposed between the pump source 320 and the output end 306 of the optical fiber 302 to focus the signal onto the inner core of the optical fiber 302. The pump light source 320 may be a laser diode emitting at 1.48 $\mu$m. An exemplary laser diode is an InGaAsP laser diode. The 1.48 $\mu$m wavelength is advantageous because it coincides with the $^4I_{15/2}$-$^4I_{13/2}$ absorption of $Er^{3+}$. This wavelength is close to a radiatively-coupled transition and essentially free of absorption from the excited state. The selection of this wavelength for $\lambda_1$ improves the pump efficiency and minimizes undesirable fiber heating. At 1.48 $\mu$m, the fiber is single-moded. Substantially all of the pump signal is introduced in the symmetrical fundamental $LP_{01}$ propagation mode of the optical fiber 302.

A signal source 330, which is advantageously a laser signal source, is also provided. The signal source 330 generates a relatively low power output signal having a wavelength $\lambda_2$ (referred to as the probe signal). In the embodiment of FIG. 7, the wavelength $\lambda_2$ is selected so as to explore the $^4I_{15/2}$-$^4I_{11/2}$ absorption transition of $Er^{3+}$, i.e. around 908 nm. An exemplary signal source is a Ti-sapphire laser source. The probe signal is directed to a 40 dB attenuator 324. The variable attenuator 424 is advantageously included in the propagation path of the probe signal to selectively attenuate the power of the signal source 330 provided to the input end 304 of the optical fiber 302. The probe signal is then input into the first end portion 304 of the optical fiber 302. In the exemplary embodiment illustrated in FIG. 7, a lens 366 (e.g., a 20-power microscope objective, or the like) is interposed between the signal source 330 and the input end 304 of the optical fiber 302 to focus the probe signal onto the inner core of the optical fiber 302. The probe signal is launched so that substantially all of the optical energy incident upon the first end portion 304 is caused to propagate equally in the fundamental ($LP_{01}$) and the second-order spatial modes ($LP_{11}$). The probe signal from the signal source 330 propagates in a forward direction in the optical fiber 302 from the first end portion 304 to the second end portion 306.

The spatial overlap of the pump mode with the $LP_{01}$ signal mode is greater than with the $LP_{11}$ signal mode. Thus, the pump-induced phase shift is larger for the $LP_{01}$ than for the $LP_{11}$ mode, and at the fiber output, the signal spatial distribution resulting from interference between the two modes changes with pump power. When the differential phase shift $\Delta\theta$ is equal to $2m\pi$ (m=integer), the power adds constructively in the vicinity of one of the two lobes of the $LP_{11}$ mode, and in the vicinity of the other lobe when $\Delta\theta = (2m+1)\pi$. A phase shift of $\pi$ is therefore needed to switch the output from one lobe to the other. The signal power in the fiber is advantageously kept at the $\mu W$ level, i.e., well below the absorption saturation intensity, to avoid power-and wavelength-dependent self-phase modulation of the signal. The weak signal emitted at the end portion 304 is mechanically chopped around 1.7 kHz by a chopper 340 and analyzed with a lock-in amplifier 350.

The pump signal can be switched on and off by selectively enabling and disabling the electrical input to the pump light source 320 with an electrical switch or the like, by modulating the pump signal, or by other conventional means. The pump signal from the pump light source 320 is directed to a beam splitter 322. Approximately 50% of the optical energy in the laser output signal passes through the beam splitter 322 and is input into the second end portion 306 of the optical fiber 302.

The optical energy from the signal source 330 is emitted from the second end portion 306 and is directed by the beam splitter 322, e.g. a dichroic mirror, towards a $\lambda_2$ detector 360. The beam splitter 322 is selected to reflect optical signals at the wavelength $\lambda_2$ so that the probe signal emitted from the signal source 330 is preferably reflected through the beam splitter 322 without significant attenuation. The beam splitter 322 is further selected to substantially pass the pump wavelength $\lambda_1$ so that substantially all the pump signal incident on the beam splitter 322 passes through the beam splitter 322. The signal source 330 is positioned in alignment with the first end 304 of the optical fiber 302 so that the probe signal passes through the beam splitter 322 along a first direction line 342 and is incident on the first end 304 of the optical fiber 302. The beam splitter 322 is oriented at a 45° angle to the first direction line 342. The pump signal is incident on the beam splitter 322 at a 45° angle and passes therethrough along the first direction line 342 toward the output end 306 of the optical fiber 302. Thus, the beam splitter 322 operates to direct the pump signal toward the output end portion 306 of the optical fiber 302 and to direct the probe signal toward the detector 360. The emitted optical energy is represented by an intensity pattern 380 in FIG. 7 observed by projection onto a screen 382. The optical detector 360 may be a photodetector, or the like. It is positioned at an angle of 45 degrees with respect to the beam splitter 322 so that the optical output signal reflected by the beam splitter 322 is incident upon the optical detector 460. As known in the art, the optical detector 460 provides an electrical output signal that is responsive to the intensity of the optical output signal incident upon the optical detector 460. The electrical output signal is advantageously amplified, e.g., by an amplifier (not represented) and the amplified output signal is provided to external electronic circuitry. For example, the output of the amplifier may be electrically connected to the input of an oscilloscope (not represented) so that the detected intensity of the optical output signal can be measured. An optical filter (not represented) may also be positioned between the beam splitter 322 and optical detector 460 so that the optical output signal exiting from the beam splitter 322 passes through the optical filter before being incident upon the optical detector 460 as a filtered output signal. Preferably, the optical filter is a narrow bandpass filter that transmits substantially all light incident on it having the probe wavelength $\lambda_2$. The pass band of the filter is sufficiently narrow so that it blocks substantially all light having the pump wavelength $\lambda_1$. Thus, only the component of the optical output signal having the probe wavelength $\lambda_2$ passes through the filter 480 and is incident on the optical detector 460 as the filtered output signal. Thus, the electrical output of the optical detector 460 is responsive to the intensity of only the component of the optical output signal having the probe wavelength $\lambda_2$.

The embodiment of FIG. 7 may advantageously comprise one of several types of Erbium-doped fiber. In a first exemplary embodiment of the present invention, the optical fiber 302 has a 6.7 $\mu$m core diameter, a numerical aperture (NA) of 0.13, and an $LP_{11}$ mode cut-off around 1.08 $\mu$m. The core may be made of $Al_2O_3$—$P_2O_5$—$SiO_2$ may be doped with $1.3 \times 10^{+19}$ $Er^{3+}$ ions/cm$^3$. With such a fiber and within the constraints imposed by laboratory testing, about 55% of the incident pump power can be launched into the fiber. In the absence of the pump 320, the interferometer 300 can be biased by stretching the optical fiber 302 until the power in one of the lobes was minimum. The nonlinear phase shift $\Delta\theta$ can be measured as a change in the relative power in this lobe when the pump signal emitted by the pump source 320 is applied. In the embodiment of FIG. 7, with an optical fiber 302 as described above, and with the wavelengths $\lambda_1$ and $\lambda_2$ selected as indicated above, the interferometer contrast, i.e., the ratio ($P_{max}$-$P_{min}$) / ($P_{max}$+$P_{min}$), where $P_{max}$ and $P_{min}$ are the maximum and minimum power in the lobe (as observed by stretching the fiber), is measured to be around 0.5-0.7. Stretching techniques are described in J. N. Blake et al., "Strain effects on highly elliptical core two-mode fibers," *Optical Letters*, 12, 9, 732-734, September 1987. It will be understood that this contrast can be increased if the launching conditions are selected judiciously.

Figure 8:
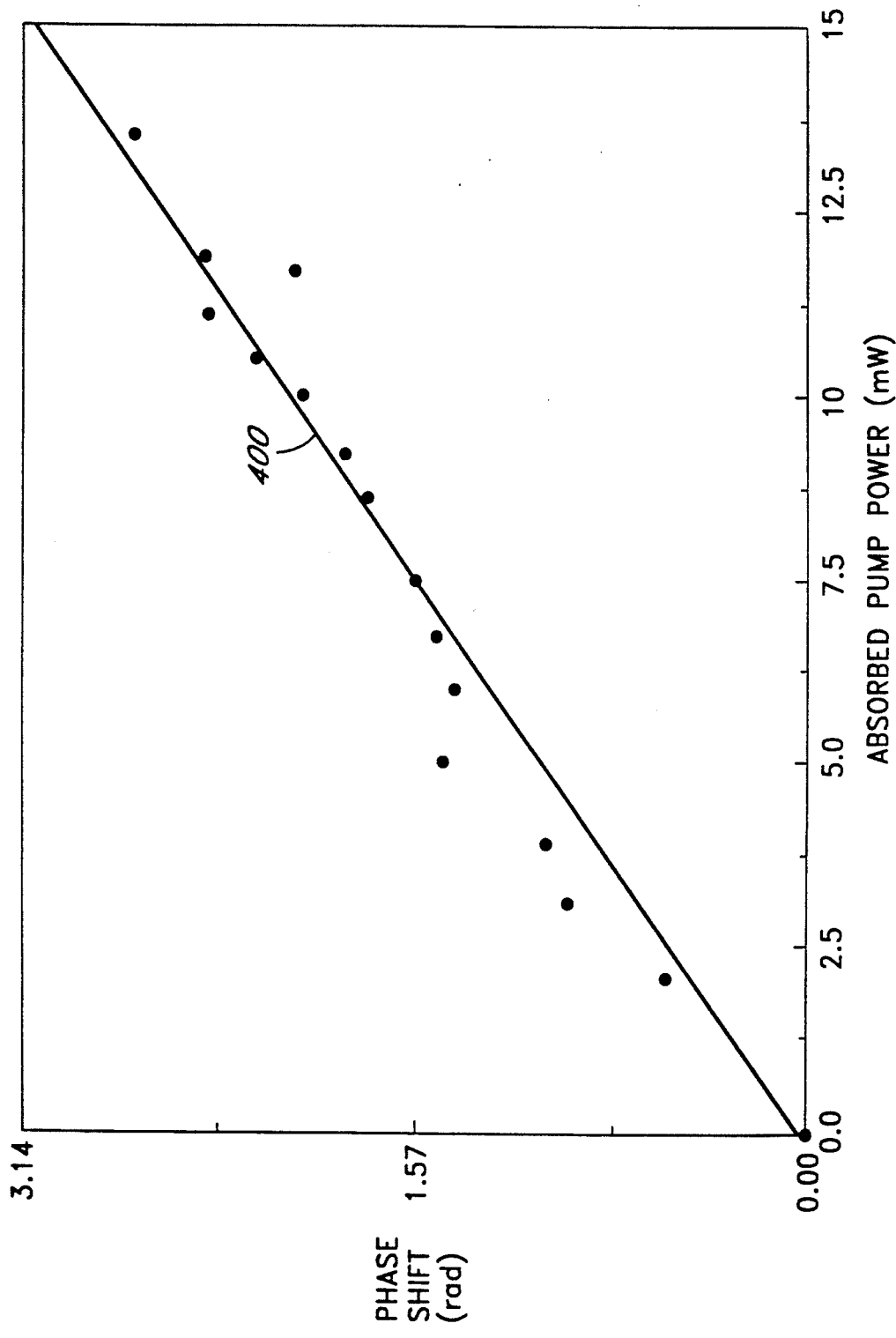
FIG. 8 illustrates the measured dependence of the nonlinear phase shift on the pump power absorbed by the optical fiber of FIG. 7 for a signal wavelength of 906 nm, a pump wavelength of 1.48 $\mu$m, and a fiber length of 3.4 m.

FIG. 8 shows the measured phase shift as a function of absorbed pump power $P_{abs}$ for a 3.4 m optical fiber and a 906 nm light probe signal emitted by the signal source 330. The pump wavelength is still selected to be 1.48 μm. The solid line 400 shown in FIG. 8 is a linear fit to the data. In FIG. 8, the phase shift varies between 0 and $2\pi$, whereas the absorbed pump power is expressed in mw and varies between 0 and 15 mW. Between 65% and 98% of the launched pump power is absorbed, depending on pump power because of saturation. The phase shift grows essentially linearly, with a slope $\Delta\theta/P_{abs}$ of 0.20 rad/mW. A phase shift of $\pi$ would require $P_{abs}=15.5$ mW (about 31 mW launched), which corresponds to a fiber length-launched pump power product $PL_\pi$ of 105 mW.m. This figure represents a factor of 500 reduction over the $PL_\pi$ product of 53 W.m reported for the same configuration with an undoped silica fiber.

In a second exemplary embodiment of the present invention represented in FIG. 7, the optical fiber 302 is selected to have the following characteristics. It has a smaller core radius (2.2 μm), a larger NA (0.22) and a higher concentration of dopant ($4.3 \times 10^{19}$ ions/cm$^3$). The higher doping permits the use of a shorter fiber (0.954 m). The pump coupling efficiency and fractional absorbed pump power are similar to the longer optical fiber 302 described above. Because of the higher energy confinement, the slope $\Delta\theta/P_{abs}$ is increased to 0.39 rad/mW. A phase shift of $\pi$ can be observed for an absorbed pump power of only 8 mW (8.9 mW launched). The signal loss in the absence of pump (also referred to as cold loss) is approximately 0.25 dB. The $PL_\pi$ product is 8.5 mW.m, which is a factor of 6200 reduction over an undoped optical fiber.

Despite its higher performance, the second shorter optical fiber 302 is more susceptible to signal launching conditions. The odd and even $LP_{11}$ modes experience different phase shifts. It is presumed that one of the modes is closer to cutoff and sees a smaller absolute phase shift. Polarization walk-off may be another contribution. These difficulties can be easily eliminated by using an elliptical core fiber carrying only one $LP_{11}$ mode.

The nonlinear phase shift depends on the detuning between the probe signal and resonance frequencies. For an isolated transition, as the detuning $\delta\nu$ is decreased (probe signal closer to resonance), the phase shift is expected to increase to a maximum, then decrease to zero at resonance. For a Lorentzian lineshape, this maximum occurs at $\delta\nu = \Delta\nu/2$, where $\Delta\nu$ is the FWHM (full width at half maximum) of the transition. Operating at this frequency is advantageous because it minimizes the pump power requirement. However, it shall be recognized that for a fixed phase shift, the smaller the detuning, the higher is the probe signal absorption. This absorption represents a loss mechanism. In a practical application, this mechanism is preferably minimized through a trade-off between pump power and loss. For a Lorentzian lineshape and far from resonance, the loss decreases as $\delta\nu^{-2}$, while the nonlinear phase shift decreases only as $\delta\nu^{-1}$. It will be understood that, with proper selection of the signal frequency, both the loss and pump power can be kept at reasonably low levels.

Figure 9:
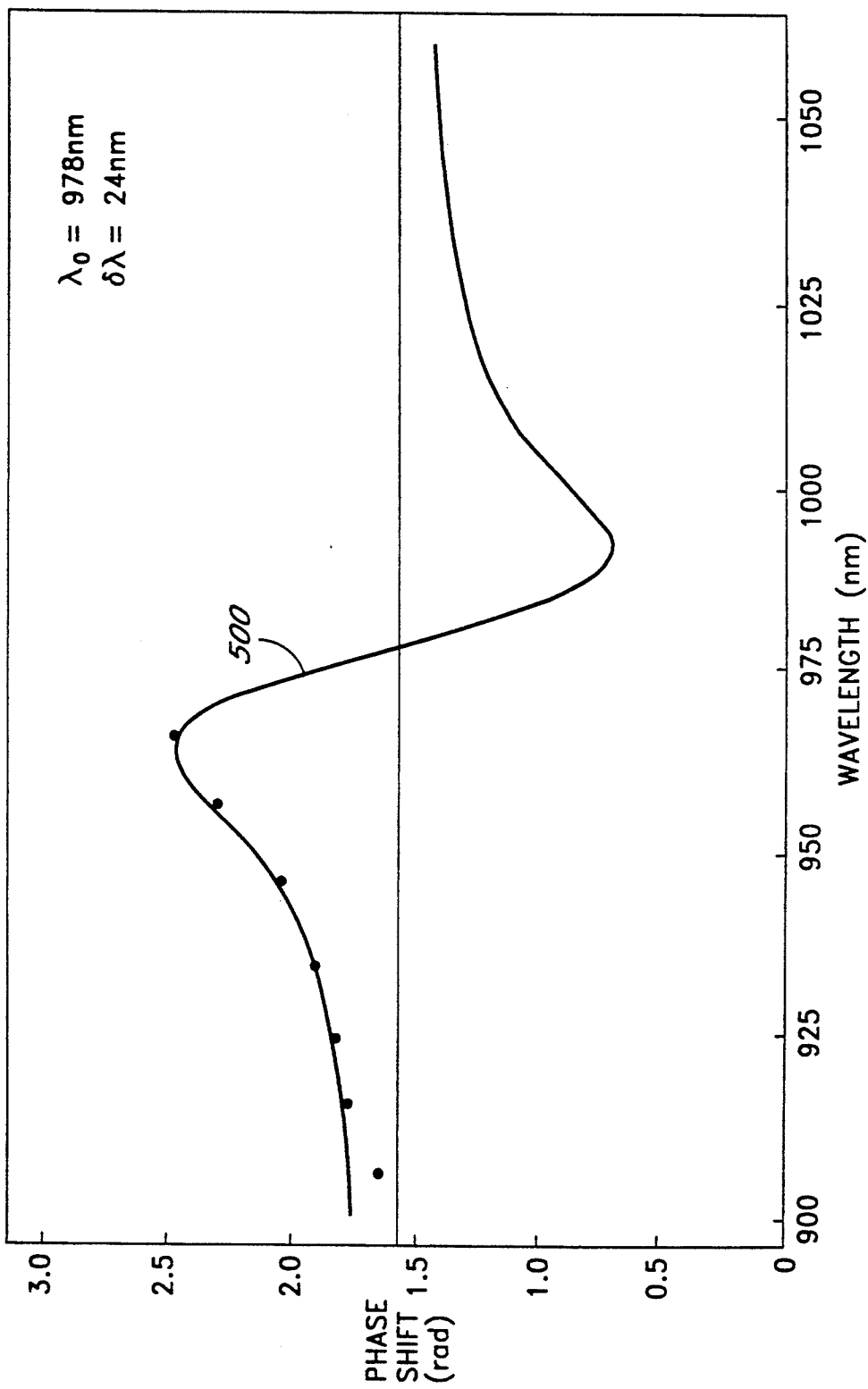
FIG. 9 plots the nonlinear phase shift as a function of signal wavelength for $P_{abs}=10$ MW.
Figure 10:
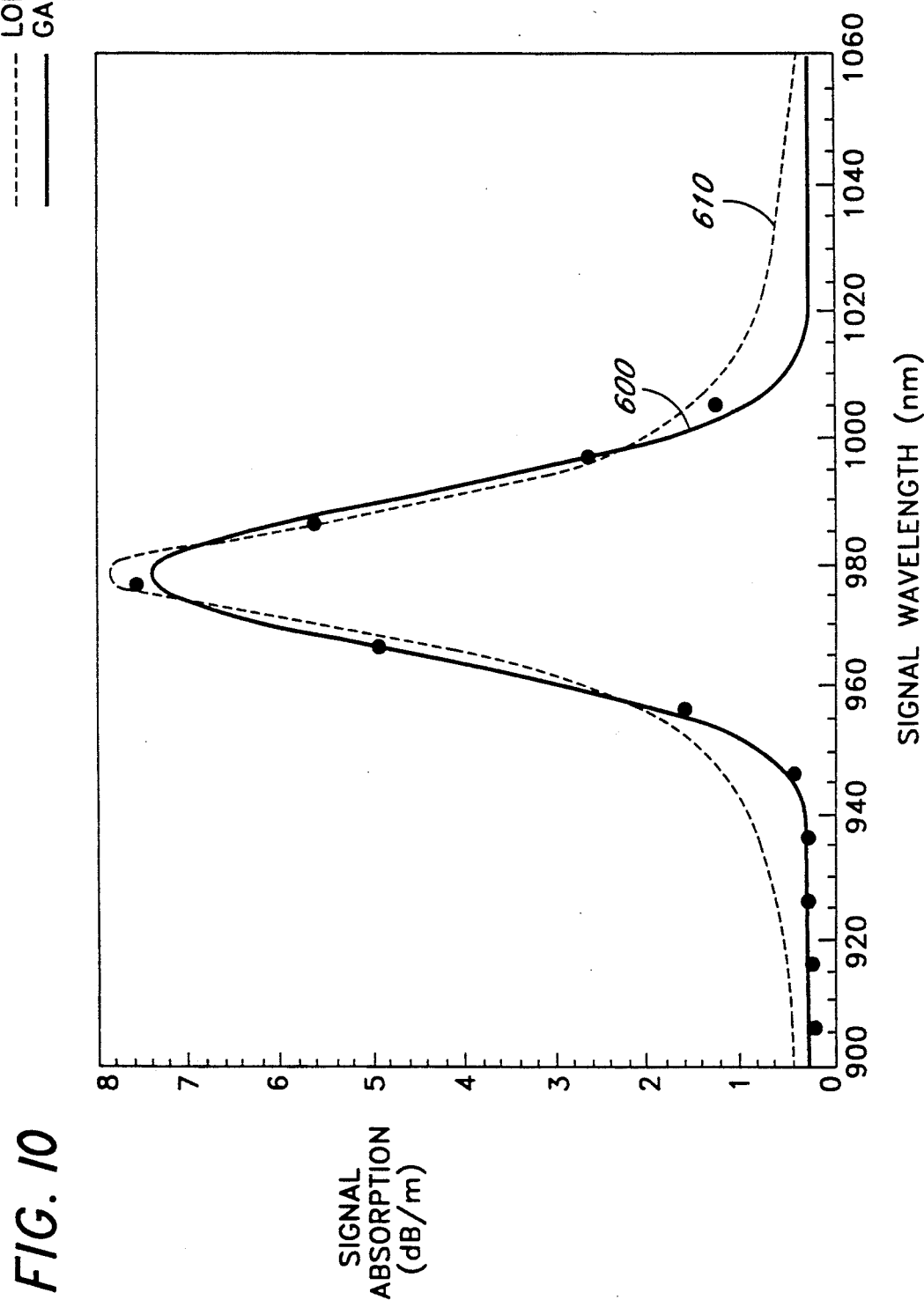
FIG. 10 illustrates the absorption spectrum for the optical fiber of FIG. 7, and plots the signal absorption as a function of the signal wavelength.

In FIG. 9, the nonlinear phase shift is plotted as a function of the signal wavelength for $P_{abs}=10$ MW. The solid curve 500 is a fit to a Gaussian lineshape centered at 978 nm, with a linewidth of 24 nm and an offset of $\pi/2$ radians. FIG. 10 illustrates the absorption spectrum for the same fiber as in FIG. 9. The solid line 600 is a fit to a Gaussian lineshape (FWHM=29 nm), a centerline of 978 nm, and an offset of 0.26 dB/m. The dashed line 610 is a fit to a Lorentzian lineshape (FWHM=24 nm, same centerline and offset). In both FIG. 9 and FIG. 10, the measurements correspond to the longer fiber described above. FIG. 10 shows a small-signal absorption spectrum in the region outside 978 nm, i.e., in the region 900–945 nm and 1015–1060 nm. The phase shift cannot be measured reliably close to the absorption peak (978 nm) because the signal is too strongly absorbed (about 8 dB/m, as indicated in FIG. 10). Data cannot be obtained on the long wavelength side of the transition where the $LP_{11}$ mode approaches cut-off and cannot be effectively excited.

FIG. 9 shows that the phase shift has two contributions, a resonant term associated with the 978-nm transition and an offset term nearly independent of wavelength. The resonant term increases towards the 978-nm resonance peak. The absorption spectrum is best fitted with a Gaussian rather than a Lorentzian (see FIG. 10), with a FWHM of 29 nm. In FIG. 9, the phase shift spectrum is fitted to a Gaussian lineshape with a constant offset. The FWHM inferred from this fit is 24 nm, in agreement with the measured absorption linewidth. The maximum resonant phase shift, which occurs near 965 nm, is about 0.9 rad, for a signal cold loss of 17.4 dB (see FIG. 10). Away from resonance, e.g. at 916 nm, the resonant phase shift is 0.18 radian but the resonant cold loss is only 0.25 dB. As discussed above, the ratio of phase shift to cold loss improves markedly away from resonance.

To explain the wavelength-independent phase shift, two possible origins can be envisioned, a thermal effect and a far-from resonance nonlinear effect arising from other transitions. A thermal effect is expected from nonradiative relaxation from the pump level to the metastable level, which generates a slight rise in the fiber temperature. Calculations show that with $P_{abs}=10$ mW, the steady-state temperature rise across the fiber cross section is extremely uniform and at most equal to 0.2° C. In a 3.4-meter long Mach-Zehnder fiber interferometer, this temperature rise would cause a very large thermal phase shift, estimated to be $15\pi$. In the two-mode fiber interferometer, the temperature rise is identical but it is so uniform that it affects the phase of both the $LP_{01}$ and $LP_{11}$ modes essentially equally and causes a negligible phase change, calculated to be less than 0.09 rad. The two-mode interferometer is therefore advantageous over the Mach-Zehnder interferometer because it is virtually insensitive to thermal effects. In a Mach-Zehnder optical fiber, heating by the pump would be the dominant source of phase shift. This analysis strongly suggests that the origin of the offset is not thermal. It is presumed that the offset arises from nonlinearities due to one or more other ground and/or excited state absorption transitions of $Er^{3+}$. The measured magnitude of the non-resonant and resonant components are reasonably well predicted by a simply quantum electronics model. It is significant that the non-resonant phase shift is about $\pi/2$ for a nonresonant cold loss of only 0.5 dB (see FIGS. 9 and 10), which indicates that far from resonance a substantial phase shift can be observed with a minimum signal loss penalty.

These results confirm the concept that the strongly enhanced nonlinearity available in a rare earth doped fiber can be used for switching. Operation far from a resonance can yield a substantial phase shift at the cost of a small signal loss. This effect is particularly important as shown by the exemplary embodiment shown in FIG. 7. The exemplary laser-diode-pumped fiber coupler of FIG. 7 can be used as a very efficient and compact optical switch.

It will be understood that other dopants can be used. The embodiment of FIG. 7 uses $Er^{3+}$ as a dopant. In fact, Erbium is far from optimum for fast switching, as its metastable level limits the response time to around 10 ms. This response time can be decreased by means of much higher pump powers and bleaching pulses, as shown in the article by S. C. Fleming and T. J. Whitley, "Measurements of pump induced refractive index change in Erbium doped fibre amplifier," *Electronics Letters,* 27, 21, 1959-1961, October 1991. Simulations show that much shorter response times are expected with other dopants, such as semiconductors, while retaining the advantage of reasonable pump power and low signal loss.

The optical coupler 300 of FIG. 7 operates as follows. The optical energy generated by the signal source 330 is advantageously input into the first end portion 304 of the optical fiber 302 at a wavelength $\lambda_2$ with the optical energy equally distributed between the fundamental $LP_{01}$ mode and the second-order $LP_{11}$ mode. When the pump source 320 is off, the optical energy from the signal source 330 will propagate through the optical fiber 302 with substantially no coupling of optical energy from the $LP_{11}$ mode to the $LP_{01}$ mode. The optical energy will be emitted from the second end portion 306 of the optical fiber 302 and the $\lambda_2$ detector 360 will detect an equal amount of optical energy in the fundamental and the first-order modes. Conversely, when the pump source 320 is activated, the spatial overlap of the pump mode with the $LP_{01}$ mode of the $\lambda_2$ optical probe signal is greater than with the $LP_{11}$ mode of the $\lambda_2$ optical probe signal. Thus, the pump-induced phase shift is larger for the $LP_{01}$ than for the $LP_{11}$ mode, and at the fiber output, the signal spatial distribution resulting from interference between the two modes changes with pump power. When the differential phase shift $\Delta\theta$ is equal to $2m\pi$ (m=integer), the power adds constructively in the vicinity of one of the two lobes of the $LP_{11}$ mode, and in the vicinity of the other lobe when $\Delta\theta=(2m+1)\pi$. A phase shift of $\pi$ is therefore needed to switch the output from one lobe to the other. Depending on the power of the pump, the optical energy emitted from the second end portion 306 of the optical fiber 302 will be in the LP01 or in the $LP_{11}$ propagation mode at the wavelength $\lambda_2$ and will be directed to the $\lambda_2$ detector 360 by the dichroic mirror 322. Thus, the signal output of the $\lambda_2$ detector 360 will be responsive to the on/off control provided by the activation/deactivation of the pump sou ce 320. In an optical signal processing system or optical communications system, the $\lambda_2$ signal output from the second end portion 306 can be advantageously provided as an input to additional optical components for further processing.

The operation of the optical coupler of FIG. 7 can be better understood by reference to the set of FIGS. 11a-11i. As explained above, the optical Kerr effect causes the effective refractive index of an optical waveguide to change in response to high intensity light energy propagating in the optical waveguide. The present invention uses the optical Kerr effect to provide a dynamic coupler for selectively switching the optical output signal derived from the probe signal on and off in response to the optical pump signal. An optical signal propagating through an optical waveguide in two spatial propagation modes will have an optical beat length that depends upon the differential effective refractive indices between the two modes. The optical beat length causes the optical signal to have distinctive optical intensity distribution patterns that vary in accordance with the phase difference between the two spatial propagation modes. The optical intensity distribution patterns are illustrated in FIGS. 11a-11i for a pump signal propagating in the fundamental $LP_{01}$ and second-order $LP_{11}$ modes. Similar distribution patterns also occur in the optical fiber 302 when the probe signal propagates in the two modes. However, in the present invention, the intensity of the probe signal is maintained at a sufficiently low level that the effect of the intensity on the effective refractive indices of the optical fiber 302 is insignificant compared to that of the pump signal.

In the exemplary embodiment of FIG. 7, when the pump signal is applied to the second end portion 306 of the optical fiber 302, the optical energy is launched in the fundamental mode only. If another pump wavelength had been selected, the optical energy could be equally distributed between the first-order $LP_{01}$ and the second $LP_{11}$ modes in the elliptical core of the two-mode fiber 302. This equal excitation would create a period pattern in the cross-sectional intensity distribution along the length of the optical fiber 302 as the two spatial modes propagate in the optical fiber 302 with different phase velocities. This is illustrated in FIG. 12 which represents a portion of the optical fiber 302, and in FIGS. 11a-11i which represent cross sections of the optical intensity distribution patterns at the locations 11a—11a, 11b—11b, etc., in FIG. 12. In FIGS. 11a-11i, the presence of optical energy in the intensity distribution is represented by the dark portions of the intensity patterns, and the absence of optical energy is illustrated by the light portions of the patterns. FIGS. 11a, 11c, 11e, 11g and 11i illustrate the highly asymmetric intensity distributions that occur at locations where the phase difference between the two modes is $N\pi$, and most of the optical power is concentrated in one-half of the elliptical core. For example, FIG. 11a illustrates the intensity distribution when the phase difference is zero (i.e., $0\pi$); FIG. 11c illustrates the intensity distribution when the phase difference is $\pi$; and FIG. 11e illustrates the intensity distribution when the phase difference is $2\pi$. When the phase difference is $(N+\frac{1}{2})\pi$, the intensity distribution is symmetric. FIG. 11b illustrates the symmetric intensity distribution when the phase difference is $\pi/2$, and FIG. 11d illustrates the symmetric intensity distribution when the phase difference is $3\pi/2$. As illustrated in FIG. 12 and in FIGS. 11a-11i, the mode intensity patterns are periodic and repeat every beat length $L_B$ along the length of the optical fiber 302.

The existence of optical power in an optical waveguide, such as the optical fiber 302, alters the refraction index of the glass medium through the optical Kerr effect. This effect is due to the third-order nonlinear polarization of the glass medium and occurs even when the optical power is small. If the pump light from the pump source 320 is launched into the optical fiber 302 with approximately equal intensity for the fundamental $LP_{01}$ and the second-order $LP_{11}$ modes, this nonlinear interaction of the light energy with the glass medium of the optical fiber 302 causes a periodic asymmetric perturbation of the refractive indices of the optical fiber 302. It has been shown that periodic perturbations in an optical fiber can cause coupling between two spatial propagation modes of an optical fiber when the periodicity of the perturbations are matched to the beat length of the two modes. Examples of mode coupling caused by periodic stresses are illustrated in B. Y. Kim, et al., "All-fiber acousto-optic frequency shifter," *OPTICS LETTERS*, Vol. 11, No. 6, June 1986, pp. 389–391; J. N. Blake, et al., "Fiber-optic modal coupler using periodic microbending," *OPTICS LETTERS*, Vol. 11, No. 3, March 1986, pp. 177–179; and J. N. Blake, et al., "All-fiber acousto-optic frequency shifter using two-mode fiber," *Proceedings of the SPIE*, Vol. 719, 1986.

The present invention operates by first adjusting the length of the optical fiber 302 between the first end 304 and the second end 306 while only the probe signal is provided as an input to the first end 304. The length of the optical fiber 302 is adjusted so that the optical intensity distribution pattern of the output optical signal exiting from the second end 306 has a maximum contrast as detected, for example, on the screen 382 or other means for observing the optical intensity distribution pattern. For example, a short section 400 of the optical fiber 400 can be stretched by conventional biasing techniques to selectively adjust the overall length of the optical fiber 302 so that the optical output signal has an optical intensity distribution pattern such as was illustrated above in FIGS. 11a, 11e or 11i, or an optical intensity distribution pattern such as was illustrated in FIGS. 11c or 11g. These optical intensity distribution patterns correspond to optical phase differences between the two modes of the probe signal of $N\pi$ ($N=0, 1, 2, \ldots$). As set forth above, these high contrast optical intensity distribution patterns occur because the symmetric $LP_{01}$ mode adds constructively to the anti-symmetric $LP_{11}$ mode on one-half of the radiation pattern to cause the bright lobe of the optical intensity distribution pattern and adds destructively on the other half to cause the dark lobe of the optical intensity distribution pattern. Thus, by varying the differential phase shift between the two modes, the positions of the bright lobe and the dark lobe are interchanged. See, for example, FIGS. 11c and 11e, above, wherein the bright lobe is represented by the solid ellipse and the dark lobe is represented by the lack of the solid ellipse.

The relative positions of the bright and dark lobes with respect to the major axis of the core of the optical fiber 302 as indicated by the optical intensity distribution pattern can be adjusted by varying the length of the optical fiber 302 as is accomplished during the adjusting step described above. Thus, the length of the optical fiber 302 is adjusted to statically bias the intensities of the two lobes. In the present invention, the positions of the bright and dark lobes are controlled by the pump signal to provide a dynamic on-off switching action. The pump signal thus acts as a perturbational signal.

As set forth above, the pump signal propagates in the optical fiber 302 in the fundamental $LP_{01}$ spatial propagation mode. The pump signal has a sufficiently high intensity that the optical Kerr effect occurs causing the effective refractive indices of the optical fiber 302 to change. However, since the pump signal is propagating only in the fundamental $LP_{01}$ mode of the optical fiber 302, the optical energy distribution of the pump signal overlaps the $LP_{01}$ mode of the probe signal more than it overlaps the $LP_{11}$ mode of the probe signal. Thus, the optical Kerr effect has a greater effect on the effective refractive index of the fundamental $LP_{01}$ mode than on the effective refractive index of the second-order $LP_{11}$ mode. This differential effect on the effective refractive indices for the two modes has the same effect as changing the length of the $LP_{01}$ mode propagation path with respect to the length of the $LP_{11}$ mode propagation path of the optical fiber 400. Thus, an additional phase difference is introduced between the $LP_{01}$ mode component and the $LP_{11}$ mode component of the probe signal 432. The introduction of the additional phase difference has the effect of causing the optical intensity distribution pattern of the output signal 470 to change from the original high contrast pattern to which it was initially adjusted to a different optical intensity distribution pattern. The intensity of the pump signal is preferably selected to cause an additional $\pi$ differential phase shift to be introduced so that the positions of the bright lobe and the dark lobe are interchanged when the pump signal is active.

It can be seen that if the length of the optical fiber 302 is initially adjusted so that the optical intensity is initially in the lower lobe before the activation of the pump source 320, then the activation of the pump signal will cause the light to switch from the lower lobe to the upper lobe. Thus, by choosing which of the two lobe patterns is bright in the absence of the pump signal (i.e., by adjusting the static biasing of the optical fiber 302), the activation of the pump signal can cause the optical signal detected by the detector 360 to switch from "on" to "off" or from "off" to "on."

The foregoing description of the operation of this aspect of the present invention was based upon the experimental embodiment wherein the pump signal was provided as a static output. However, it should be understood that the pump signal can be provided as a series of shorter or longer pump pulses to provide shorter or longer output pulses. It can be seen that this aspect of the present invention can be advantageously used in optical logic switches, or other such devices, wherein the pump signal is a controlling signal and the probe signal is the controlled signal.

Mathematical Analysis

The above-described operation of the present invention can be understood by referring to the following mathematical analysis.

A. Fiber Model

Figure 13:
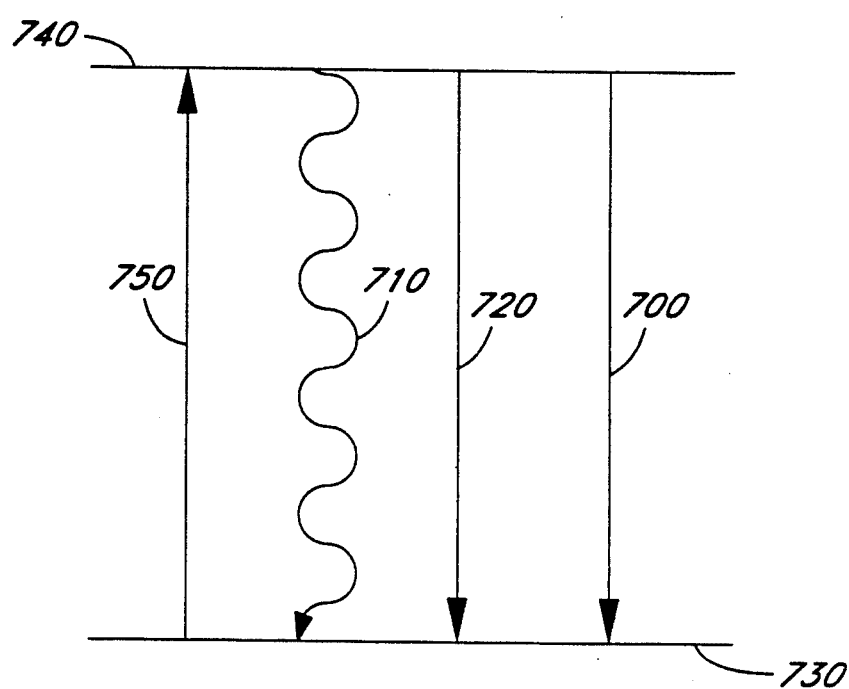
FIG. 13 illustrates a two-level system comprising two levels, and modelling the transitions occurring in the active medium of the optical fiber of FIG. 7.

A fiber with a core made of a material with electronic energy levels can be modelled as a two-level system. The fiber is assumed to be optically end pumped at the frequency $\nu_p$ (wavelength $\lambda_p$), and probed by a signal at the frequency $\nu_s$ (wavelength $\lambda_s$) co-propagating with the pump, both in the vicinity of the transition frequency $\nu_0$ (wavelength $\lambda_0$). Stimulated absorption, indicated by the numeral 750, takes place from the ground state 730 (level 1) to the excited state 740 (level 2) with a rate $W_{12}$, as illustrated in FIG. 13. Electrons in the upper level decay back down to the ground state through three mechanisms, shown schematically in FIG. 13. The first one is radiative relaxation 700, or fluorescence, or spontaneous emission, characterized by a lifetime $\tau_f$; a second mechanism is nonradiative relaxation 710, with a lifetime $\tau_{nr}$, which occurs through phonon coupling; and the third mechanism is stimulated emission 720, characterized by a rate $W_{21}$.

Level 1 and level 2 are assumed to have a degeneracy $g_1$ and $g_2$, respectively. In the context of this analysis, it is assumed that all degenerate levels within either level had the same population, i.e. essentially lie within less than $\Delta E = \kappa T$ from each other, where $\kappa$ is the Boltzman constant and T is the absolute temperature. Under this assumption, the rates $W_{12}$ and $W_{21}$ satisfy:

$$\frac{W_{21}}{W_{12}} = \frac{\sigma_{21}(\nu)}{\sigma_{12}(\nu)} = \frac{g_1}{g_2} \qquad (1)$$

where $\sigma_{12}(\nu)$ and $\sigma_{21}(\nu)$ are the stimulated absorption and emission cross sections of the transitions, respectively.

In the following, it is useful to define the natural lifetime $\tau$ of level 2 as the lifetime in the absence of a pump or signal, in which case $W_{12} = W_{21} = 0$ and electrons decay from level 2 to level 1 at a rate $\tau$ given by:

$$1/\tau = 1/\tau_f - 1/\tau_{nr} \qquad (2)$$

The radiative lifetime $\tau_f$ may be expressed as a function of the center wavelength $\lambda_0$ of the transition and its oscillator strength f through:

$$\tau_f = g_2 \frac{m}{e^2 f K} \frac{\epsilon_0 c \lambda_0^2}{2\pi n_0} \qquad (3)$$

where e and m are the charge and the mass of the electron, respectively, $\epsilon_0$ is the permitivity of vacuum, $n_0$ is the index of refraction of the material, c is the speed of light and K is the Lorentz correction factor, given by $K = (n_0^2 + 2)^{2/9}$.

The absorption cross section $\tau_{12}(\nu)$ is related to the spectroscopic parameters of this two-level system by:

$$\sigma_{12}(\nu) = \frac{g_2}{g_1} \frac{\lambda_0^3}{8\pi n_0^2 \tau_f \lambda} g''(\nu) \qquad (4)$$

where $\lambda$ is the wavelength associated with frequency $\nu$, and $g''(\nu)$ is the imaginary part of the transition line shape.

Two types of line shape functions can be considered, a Lorentzian or a Gaussian, the first situation applying to a purely homogeneously broadened transition, and the second to purely inhomogeneous broadening. The following analysis will be restricted to a Lorentzian transition centered at frequency $\nu_0$ (wavelength $\lambda_0$) and with a full width at half maximum (FWHM) equal to $\delta\nu$. In this case, the real part $g'(\nu)$ and imaginary part $g''(\nu)$ of the transition line shape, such that $g''(\nu)$ is normalized to unity across the frequency space, are given by:

$$g'(\nu) = \frac{1}{\pi} \frac{\Delta\nu}{\Delta\nu^2 + \left(\frac{\delta\nu}{2}\right)^2} \qquad (5a)$$

$$g''(\nu) = \frac{1}{2\pi} \frac{\delta\nu}{\Delta\nu^2 + \left(\frac{\delta\nu}{2}\right)^2} \qquad (5b)$$

where $\Delta\nu = \nu - \nu_0$ is the detuning from line center $\nu_0$.

Figure 14:
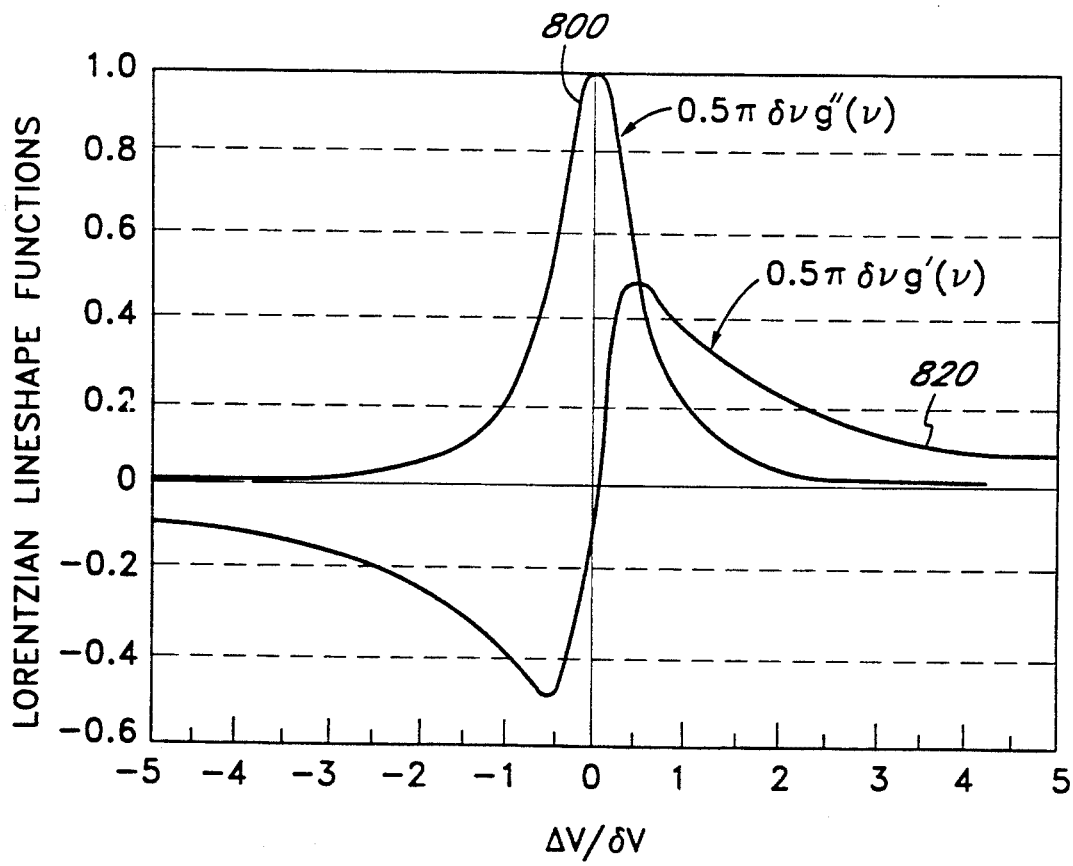
FIG. 14 illustrates the dependence of the real part $g'(\nu)$ and imaginary part $g''(\nu)$ of the Lorentzian transition lineshapes on the normalized detuning from line center $\Delta\nu/\delta\nu$.

FIG. 14 shows the dependence of these two functions on the normalized detuning from line center $\Delta\nu/\delta\nu$. The imaginary part $g''(\nu)$, represented by the numeral 800, is maximum at line center and decreases far from line center as $1/\Delta\nu^2$. The real part, $g'(\nu)$, represented by the numeral 820, is zero at line center, maximum for a detuning $\Delta\nu = \delta\nu/2$, and decays far from line center as $1/\Delta\nu$. These two functions are important as they contain the frequency dependence of the nonlinear index change and the signal loss.

B. Nonlinear Index Change

In the absence of a pump, the ground state population density $N_1$ is equal to the total species population density $N_0$. When the pump is turned on, some of the ground state population is excited into the upper state, which causes a change in refractive index. The contribution of the two-level transition to the refractive index n is given by:

$$n = \frac{e^2 f K}{m} \frac{\lambda_0}{8 n_0 c \epsilon_0} \Delta N g'(\nu) \qquad (6)$$

From Equation 5a, it can be seen that the contribution to the refractive index is zero at line center, and maximum for a detuning $\Delta\nu_s = \delta\nu/2$, as illustrated in FIG. 14. $\Delta N$ is the difference in population density, defined as:

$$\Delta N = N_1/g_1 - N_2/g_2 \qquad (7)$$

Inserting the expression for $\tau_f$ from Equation 3 in Equation 6 gives a new expression for the refractive index as a function of measurable quantities:

$$n = g_2 \frac{\lambda_0^3}{16\pi n_0^2 \tau_f} \Delta N g'(\nu_s) \qquad (8)$$

The other parameter of interest is the loss experienced by the signal, which arises from absorption from the ground state. This loss can be characterized in terms of the absorption coefficient $\alpha_s$:

$$\alpha_s = \sigma_{12}(\nu_s) N_0 \qquad (9)$$

where $\sigma_{12}(\nu_s)$ is the absorption cross section at the signal frequency $\nu_s$.

Equation 8 shows that the index is proportional to $g'(\nu_s)$, and Equation 9 shows that the signal absorption loss coefficient is proportional to $g''(\nu_s)$. If the signal frequency is in the vicinity of $\nu_0$, $g''(\nu_s)$ is large, as shown in FIG. 14, and the signal suffers a strong loss. Also, since $g'(\nu_s)$ is zero at line center, the signal needs to be detuned from line center to obtain a finite index. The index is maximum for $\Delta\nu_s = \delta\nu/2$, and this may be a good choice of signal frequency, as the signal loss is then half what it is at line center. If further signal loss reduction is desired, it should be noted that $g'(\nu_s)$, which decays as $1/\Delta\nu_s$, decreases more slowly than $g''(\nu_s)$, which decays as $1/\Delta\nu_s^2$, as illustrated in FIG. 14. In other words, far from line center the ratio of index, as given by Equation 8, to signal loss, as given by Equation 9, varies as $\Delta\nu$. This simple results shows that by moving away from line center, the loss drops faster than the index and that proper selection of the signal frequency is a means of controlling the relative magnitude of the loss and of the induced phase shift. Conversely, it also means that a compromise must be made between the pump power needed to obtain a specified phase shift and the amount of signal loss that can be tolerated.

C. Pump Power and Population Change

To calculate the nonlinear index change, the population difference $\Delta N$ is preferably related to the pump power launched into the fiber. This can be done through the rate equations, which for a two-level laser system can be written as:

$$\frac{dN_1}{dt} = \frac{N_2}{\tau} - W_{12}N_1 + W_{12}N_2 \quad (10a)$$

$$N_1 + N_2 = N_0 \quad (10b)$$

where $W_{12}$ and $W_{21}$ are the stimulated absorption and emission rates introduced above. See for example W. Koechner, in *Solid State Laser Engineering*, Springer Verlag Services in *Optical Sciences*, Vol. 1, New York, 1976; and E. Desurvire et al., "High-gain erbium-doped travelling wave fiber amplifier," *Optics Letters*, 12. 888-990 (1987). At steady rate, d/dt is zero, and the solutions of Equations 10a and 10b for $N_1$ and $N_2$ are:

$$N_1 = \frac{1 + W_{21}\tau}{1 + (W_{21} + W_{12})\tau} N_0$$

$$N_2 = \frac{W_{12}\tau}{1 + (W_{21} + W_{12})\tau} N_0$$

From Equations 1 and 7, it can be derived that:

$$\frac{\Delta N}{N_0} = \frac{1}{g_1} \frac{1}{1 + \gamma W_{12}\tau} \quad (11)$$

where $\gamma = 1 + g_1/g_2$. This equation shows that: (1) in the absence of pump power ($W_{12}=0$), the population difference is equal to $N_0/g_1$; (2) when a pump is applied, the population difference decreases; and (3) for very high pump powers ($W_{12}\tau > 1$) the population difference becomes vanishingly small.

It is useful at this point to define the pump saturation intensity $I_{p,sat}$ as the intensity at which the population difference $\Delta N$ is half its unpumped value. Namely, from Equation 11, $\gamma W_{12}\tau$ equals one. For a two-level system, the pumping rate $W_{12}$ can be related to the absorption cross section of the transition and the pump power intensity $I_p$ launched into the material by:

$$W_{12} = \frac{\sigma_p}{h\nu_p} I_p \quad (12)$$

where $I_p = P_p/A$, $P_p$ is the pump power, A is the area illuminated by the pump beam, $\sigma_p = \sigma_{12}(\nu_p)$ is the absorption cross section for the pump, and h is the Planck constant. For maximum absorption and optimum utilization of the pump photons, the pump is assumed in the following to be centered on the transition, i.e. $\nu_p = \nu_0$. From Equation 12:

$$I_{p,sat} = \frac{h\nu_p}{\gamma \sigma_p \tau} \quad (13)$$

With this definition, the population difference, as given by Equation 11, can be expressed as:

$$\frac{\Delta N}{N_0} = \frac{1}{g_1} \frac{1}{1 + \frac{P_p}{AI_{p,sat}}} \quad (14)$$

In the case of an end-pumped optical fiber, the pump power launched at $z=0$ is gradually absorbed along the fiber, so that $P_p$ is a function of the position z along the fiber. The population difference $\Delta N$ and the index are therefore also functions of z. Taking the z-dependence into account is accomplished by writing the evolution of the pump power along the fiber as:

$$\frac{dP_p}{dz} = -\sigma_{12}(\nu_p)N_1(z)P_p(z) + \sigma_{21}(\nu_p)N_2(z)P_p(z) \quad (15)$$

where the first term arises from absorption from the ground state, and the second term from emission from the excited state back to the ground state. From Equations 1, 14 and 15, it can be derived that $$\frac{dP_p}{dz} = -\sigma_p P_p(z)\left[N_1(z) - \frac{g_1}{g_2}N_2(z)\right] = -\frac{\alpha_p}{1 + \frac{P_p(z)}{AI_{p,sat}}} P_p(z) \quad (16)$$

where $\alpha_p = \sigma_p N_0$ is the absorption coefficient of the pump at low pump level. This last equation expresses the well-known result that the absorption coefficient saturates as $1/[1 + I_p/I_{p,sat}]$.

The solution to Equation 16 for $P_p(z)$ can be shown to be:

$$\ln\left(\frac{P_p(z)}{P_p(0)}\right) + \frac{1}{AI_{p,sat}}[P_p(z) - P_p(0)] = -\alpha_p z \quad (17)$$

When the pump intensity is much lower than the pump saturation intensity ($P_P < I_{p,sat}A$), the linear term in the left hand side of Equation 17 is negligible and the pump power varies exponentially with length, as expected in the unsaturated regime. For pump intensities comparable or greater than the saturation intensity, the absorption coefficient is reduced due to significant depopulation of the ground state, and a smaller fraction of pump power is absorbed. Setting $z=L$ in Equation 17 gives the pump power $P_p(L)$ at the output end of the fiber. An important quantity in this model is the total amount of pump power absorbed by the fiber, which is given by:

$$P_{abs} = P_p(0) - P_p(L) \quad (18)$$

D. Phase Shift

The phase shift $\phi$ along the length of the fiber is given by:

$$\phi = \int_0^L \frac{2\pi}{\lambda_s} n(z) dz$$

so that the change of phase $\Delta\phi$ due to the presence of the pump is $$\Delta\phi = \int_0^L \frac{2\pi}{\lambda_s} \Delta n(z) dz$$

where $\Delta n(z) = n(P_p) - n(P_p = 0)$ From Equations 8 and 14, $$\Delta n(z) = -\frac{g_2}{g_1} \frac{\lambda_0^3}{16\pi n_0^2 \tau_f} N_0 g^1(\nu_s) \frac{\frac{P_p(z)}{AI_{p,sat}}}{1 + \frac{P_p(z)}{AI_{p,sat}}} \quad (19)$$

Combining Equations 13 and 17-19, the desired expression for $\Delta\phi$ is:

$$\Delta\Phi = -\frac{g_1 + g_2}{g_1} \frac{1}{8n_0^2 hc} \frac{\lambda_p \lambda_0^3}{\lambda_s} \frac{\tau}{\tau_f} \frac{P_{abs}}{A} g^1(\nu_s) \quad (20)$$

This expression shows that the nonlinear phase shift is proportional to the pump power absorbed by the fiber and to the reciprocal of the core area. Since the fiber must be essentially single moded at the wavelength of operation $\lambda_s = \lambda_p = \lambda_0$, the core area A is approximately proportional to $\lambda_0^2$, which means that the phase shift scales approximately linearly with $\lambda_0$. Everything else being equal to the phase shift is larger in the infrared portion of the spectrum.

E. Signal Loss

As pointed out above, the enhancement of the nonlinear index near resonance is associated with an increment in the signal loss due to ground state absorption. When the pump is turned on, the ground state absorption decreases and the signal loss also decreases. This can create problems in some applications. In practice, it is desirable to keep the pump-off signal loss to a minimum, and to minimize the change in signal absorption induced by the pump. This last requirement may be more sensitive when this effect is implemented in switches used in intensity modulated transmission systems, but, in general, it is not expected to be a major problem. In the following, the signal loss is analyzed when the pump is off.

The signal loss coefficient is given by Equation 9. Replacing in that equation the cross section by its expression, as given by Equation 4, it is possible to obtain the following expression of the signal loss $L_{dB} = 4.34\alpha_s L$, in dB:

$$L_{dB} = 4.343 \frac{g_2}{g_1} \frac{\lambda_0^3}{8\pi n_0^2 \tau_f \lambda_s} N_0 g^{\parallel}(\nu_s) L \quad (21)$$

F. Frequency Response

The maximum operating frequency of the system is limited by how fast electrons in the excited level return to the ground state after the pump is turned off. This relaxation time T is given by:

$$T^{-1} = \tau_f^{-1} + \tau_{nr}^{-1} \quad (22)$$

where $\tau_f$ results from spontaneous emission and $\tau_{nr}$ is a consequence of nonradiative decay. For silica in the near infrared, $n_0 = 1.45$ and $K = 1.87$, so that Equation 3 gives for $\tau_f$:

$$\tau_f(ns) = 5.53 g_2 \frac{\lambda_0^2(\mu m)}{f} \quad (23)$$

With an oscillator strength of unity (f=1), a nondegenerate transition ($g_2 = 1$) and $\lambda_0 = 1$ μm, then $\tau_f = 5.53$ ns which corresponds to a bit rate equal $\tau_f^{-1}$ of 0.18 Gbit/s. At 1 μm wavelength, this is about the maximum bit rate achievable if spontaneous emission is the only decay mechanism. To obtain rates in excess of one Gbit/s, nonradiative decay must be present, and, as discussed below, this requires an increase in pump power. Thus, there is a compromise to be made between speed and pump power.

G. Pump Dower requirement and signal loss for $\pi$ phase shift

For most switch applications, the phase shift must be equal to $\pi$ in order to switch power interferometrically from one channel to another. It is therefore useful to define and characterize the pump power for which the magnitude of the phase shift is $\pi$. This pump power requirement obviously depends on the fiber length. A good figure of merit for this system is the pump power-length product for a $\pi$ phase shift.

An interesting observation from Equation 20 is that the absorbed pump power required to obtain a phase shift magnitude of $\pi$ is independent of the fiber length and equal to:

$$P_{abs} = \frac{8g_1 \pi n_0^2 hc}{g_1 + g_2} \frac{\lambda_s}{\lambda_p \lambda_0^3} \frac{\tau_f}{\tau} \frac{A}{|g^1(\nu_s)|} \quad (24)$$

Since not all the pump power is necessarily absorbed by the fiber, a more useful quantity is the launched or input pump power, which is a better representation of the pump power required from the laser. This quantity can be calculated form the expression of the pump power at the end of the fiber (Equation 17 with z=L), in which the difference $P_p(0) - P_p(L)$ is replaced by the known quantity $P_{abs}$ (Equation 24). The nonlinear equation for the pump power, as given by Equation 17, is then simplified to:

$$\ln\left(\frac{P_p(L)}{P_p(0)}\right) = -\alpha_p L + \frac{P_{abs}}{AI_{p,sat}} \quad (25)$$

and the pump power requirement is then $$P_p(0) = \frac{P_{abs}}{1 - \exp(\sigma_p N_0 L + P_{abs}/AI_{p,sat})} \quad (26)$$

Since it is necessary that $P_p(0) > 0$, from Equation 26, the following condition can be derived:

$$\sigma_p N_0 L \geq \frac{P_{abs}}{AI_{p,sat}}$$

That condition is preferably satisfied. Hence, to obtain a $\pi$ phase shift, there is a minimum $L_{min}$, which is found from Equations 13 and 24 to be:

$$L_{min} = \frac{8\pi g_1 n_0^2 \tau_f \lambda_s}{N_0 g_2 \lambda_0^3 |g^1(\nu_s)|} \quad (27)$$

The expressions for the pump power (Equation 26), the signal loss (Equation 21), and the phase shift (Equation 20) are the main results of the analysis. These equations provide the dependence of the variable of interest on the parameters of the transition and the fiber.

It is interesting to note that in these expressions, the length L is always multiplied by the concentration $N_0$. This means that the effect of increasing the concentration, assuming other parameters do not change, is to reduce the length in the same proportion. One of the conclusions of this model is, therefore, that it is important to select dopants with high solubility limits in silica to produce very short devices.

Various embodiments of the present invention have been described above. Although the invention has been described with reference to a specific embodiment, the description is intended to be illustrative of the invention and is not intended to be limiting. Referring to FIG. 7, for example, it should be understood by one skilled in the art that means other than the illustrated bulk optic components can be used to construct the apparatus of the present invention. For example, an offset optical fiber splice can be used to couple light from a selected lobe of the optical intensity distribution pattern of the two-mode optical fiber 302 to a single-mode optical fiber. Such a splice is illustrated, for example, in copending U.S. patent application Ser. No. 017,882, filed on Feb. 20, 1987, abandoned in favor of Ser. No. 245,717, now U.S. Pat. No. 4,915,468, which is assigned to the assignee of the present application. Furthermore, the probe signal and the pump signal can be input through the same end portion of the optical waveguide. The pump source may be selected to provide approximately equal excitation in the fundamental and second-order modes of the optical waveguide, whereas the probe signal may be caused to propagate in one or the other of the fundamental or the second-order spatial modes. The optical waveguide may also be formed into a tightly wound coil to provide an $LP_{11}$ mode stripper. Finally, the detecting system in FIG. 7 may further comprise an optical mask to block approximately half of the optical path to be detected. Such a mode strippers and such an optical mask are described in U.S. Pat. No. 4,895,421, issued on Jan. 23, 1990, and assigned to the assignee of the present invention. This patent is hereby incorporated by reference herein. Various other modifications and applications will be apparent to those skilled in the art.

We claim:

1. An apparatus for controlling an optical signal, comprising:
   a source of light which produces said optical signal;
   an optical waveguide comprising an active medium, said optical signal being coupled to said waveguide for propagation therein, said waveguide having first and second spatial propagation modes for said optical signal, said first and second modes having first and second indices of refraction, respectively; and
   a pump source coupled to introduce a pump signal into at leas tone of said spatial modes to optically perturb at least one of said first and second indices of refraction, said optical signal having a spatial intensity distribution in said waveguide that varies as a function of the perturbation.

2. The apparatus of claim 1, wherein said second spatial mode is a higher order than said first spatial mode.

3. An apparatus for controlling an optical signal, comprising:
   an optical waveguide comprising an active medium, said waveguide having first and second spatial propagation modes, said first and second modes having first and second indices of refraction, respectively, said second spatial mode being of a higher order mode than said first spatial mode, the optical waveguide having a cross section taken perpendicular to a longitudinal axis of said waveguide which is non-circular in shape and which has cross-sectional dimensions selected such that the waveguide guides light in the higher order mode in only a single stable intensity pattern; and
   a pump source coupled to introduce a pump signal into at least one of said spatial modes to optically perturb at least one of said first and second indices of refraction, said optical signal having a spatial intensity distribution in said waveguide that varies as a function of the perturbation.

4. The apparatus of claim 1, wherein the perturbation of said at least one of the effective refractive indices phase shifts an optical signal component propagating in one of said first and second modes.

5. The apparatus of claim 4, wherein said pump source has a power, said pump source varying the intensity of said pump signal to vary said phase shift.

6. The apparatus of claim 4, wherein said phase shift is approximately $\pi$.

7. An apparatus for controlling an optical signal, comprising:
   an optical waveguide comprising an active medium, said waveguide having first and second spatial propagation modes, said first and second modes having first and second indices of refraction, respectively;
   a pump source coupled to introduce a pump signal into at least one of said spatial modes to optically perturb at least one of said first and second indices of refraction, the intensity of said pump signal being selected to produce a phase shift in a first optical signal component propagating in one of said modes such that said first component has a phase difference of approximately $\pi$ radians with respect to a second optical signal component propagating in the other of said modes, said optical signal having a spatial intensity distribution in said waveguide that varies as a function of said phase difference; and
   wherein said pump signal phase switches the optical energy of said optical signal from said first mode to said second mode and reciprocally.

8. An apparatus for controlling an optical signal, comprising:
   an optical waveguide comprising an active medium, said waveguide having first and second spatial propagating modes, said first and second modes having first and second indices of refraction, respectively;
   a pump source coupled to introduce a pump signal into at least one of said spatial modes to optically perturb at least one of said first and second indices of refraction, the intensity of said pump signal being selected to produce a phase shift in a first optical signal component propagating in one of said modes such that said first component has a phase difference of approximately $\pi$ radians with respect to a second optical signal component propagating in the other of said modes, said optical signal having a spatial intensity distribution in said waveguide that varies as a function of said phase difference; and wherein said pump signal has a pump power, said pump power being greater than $P_{abs}/1-\exp(\sigma_p N_0 L + P_{abs}/AI_{p,sat})$, wherein $P_{abs}$ is the total amount of pump power absorbed by the waveguide, $\sigma_p$ is the absorption cross section for said pump source, $N_0$ is the total species population density for said active medium, L is the length of the optical waveguide, A is the area of the optical waveguide illuminated by the pump signal, and $I_{p,sat}$ is the pump saturation intensity for said active medium.

9. An apparatus for controlling an optical signal, comprising:

an optical waveguide comprising an active medium, said waveguide having first and second spatial propagation modes, said first and second modes having first and second indices of refraction, respectively; and a pump source coupled to introduce a pump signal into at least one of said spatial modes to optically perturb at least one of said first and second indices of refraction, said optical signal having an optical intensity distribution pattern that varies as a function of the phase relationship between light propagating in said first and second modes, said optical intensity distribution pattern having at least two lobes.

10. The apparatus of claim 1, wherein said active medium is a rare earth.

11. The apparatus of claim 1, wherein said active medium is Erbium.

12. The apparatus of claim 1, wherein said active medium is a semiconductor material.

13. An apparatus for controlling an optical signal, comprising:

an optical waveguide comprising an active medium, said waveguide having first and second spatial propagation modes, said first and second modes having first and second indices of refraction, respectively;

a pump source coupled to introduce a pump signal into at least one of said spatial modes to optically perturb at least one of said first and second indices of refraction, said optical signal having a spatial intensity distribution in said waveguide that varies as a function of the perturbation; and wherein said optical signal has a first wavelength and said pump signal has a second wavelength, said second wavelength being proximate to an absorption transition of said active medium.

14. The apparatus of claim 13, wherein said first wavelength is proximate to a further absorption transition of the active medium, thereby reducing the power of said pump source and increasing the loss of said optical signal for a specified phase shift.

15. The apparatus of claim 14, wherein said absorption transition and said further absorption transition are the same.

16. The apparatus of claim 13, wherein said first wavelength is selected away from a further absorption transition of the active medium, thereby increasing the power of said pump source and reducing the loss of said optical signal for a specified phase shift.

17. The apparatus of claim 1, wherein said optical waveguide comprises silica.

18. The apparatus of claim 1, wherein said optical waveguide is an Erbium-doped silica optical fiber.

19. An apparatus for controlling an optical signal, comprising:

an optical waveguide comprising an active medium, said active medium having an oscillator strength, said oscillator strength being greater or equal to one, said waveguide having first and second spatial propagation modes, said first and second modes having first and second indices of refraction, respectively; and a pump source coupled to introduce a pump signal into at least one of said spatial modes to optically perturb at least one of said first and second indices of refraction, said optical signal having a spatial intensity distribution in said waveguide that varies as a function of the perturbation.

20. An apparatus for controlling an optical signal, comprising:

an optical waveguide comprising an active medium comprising a light propagation medium that supports at least first and second spatial propagation modes, said optical waveguide having a first effective refractive index for light propagating in said first spatial propagation mode and a second effective refractive index, said second effective refractive index different from said first effective refractive index, for light propagating in said second spatial propagation mode so that light propagating in one of said modes propagates at a phase propagation velocity that is different from the phase propagation velocity of light propagating in the other of said modes;

an optical signal source that supplies a first optical input signal to said optical waveguide at a first optical wavelength, said first optical wavelength selected so that said first optical input signal has a first spatial mode component that propagates in said optical waveguide in said first spatial propagation mode and a second spatial mode component that propagates in said second spatial propagation mode, said first spatial mode component being shifted in phase with respect to said second spatial mode component as said first optical input signal propagates in said optical waveguide; and a pump source that supplies a second optical input signal to said optical waveguide at a second optical wavelength, said second optical wavelength selected so that said second optical input signal propagates in said optical waveguide in at least said first spatial propagation mode, said second optical input signal having an intensity that can be selected to perturb said first effective refractive index relative to said second effective refractive index to change the amount by which said first spatial propagation mode component of said first optical input signal is shifted in phase with respect to said second spatial mode component of said first optical input signal as said first and second spatial propagation mode components propagate in said optical waveguide.

21. The apparatus of claim 20, wherein said active medium is a rare earth.

22. The apparatus of claim 20, wherein said active medium is Erbium.

23. The apparatus of claim 20, wherein said active medium is a semiconductor material.

24. The apparatus of claim 20, wherein said first wavelength is less than said second wavelength.

25. The apparatus of claim 20, wherein said first wavelength is proximate to a first absorption resonance of said active medium and wherein said second wavelength is proximate to a second absorption resonance of the active medium.

26. The apparatus of claim 20, wherein said first wavelength is approximately 906 nm, and said second wavelength is approximately 1.48 μm.

27. The apparatus of claim 20, wherein said first spatial propagation mode is the fundamental $LP_{01}$ propagation mode and wherein said second spatial propagation mode is the second-order $LP_{11}$ propagation mode.

28. The apparatus of claim 20, wherein said optical waveguide is a two-mode optical fiber having an elliptical core.

29. The apparatus of claim 20, wherein:
said optical waveguide is a two-mode optical fiber;
said first spatial mode of said waveguide is the fundamental $LP_{01}$ spatial propagation mode of said optical fiber and said second spatial mode of said waveguide is the second-order $LP_{11}$ spatial propagation mode of said optical fiber;
substantially all the light of said second optical input signal propagates in the fundamental $LP_{01}$ spatial propagation mode of said optical fiber; and
the light of said first optical signal propagates substantially equally in said fundamental $LP_{01}$ spatial propagation mode and said second-order $LP_{11}$ propagation mode of said optical fiber.

30. The apparatus of claim 20, wherein the phase relationship between the first spatial mode component and the second spatial mode component of said first optical input signal produces an intensity distribution pattern having at least first and second lobes, the intensity of the light in said first and second lobes at said first wavelength varying in accordance with the phase relationship between said first spatial mode component and said second spatial mode component, said apparatus further including means for detecting the intensity of the light in one of said first and second lobes at said first wavelength, said intensity varying in accordance with the intensity of said second optical input signal.

31. The apparatus of claim 30, wherein said means for detecting light in said one of said first and second lobes at said first wavelength includes an optical detector.

32. The apparatus of claim 20, wherein said optical waveguide has a length between an input end and an output end that is selected so that at said output end said first spatial mode component and said second spatial mode component of said first optical input signal have a relative phase difference of $N\pi$, for N equal to an integer (0, 1, 2, 3, ...), such that substantially all of the light intensity at said first wavelength is concentrated in a first lobe of an optical intensity distribution pattern at said output end when said second input signal has a first low intensity and such that light intensity in said first lobe decreases when said intensity of second input signal increases.

33. The apparatus of claim 30, further including means for detecting the intensity of the light in a selected one of said first and second lobes.

34. A method of controlling an optical signal in an optical waveguide, comprising the steps of:
providing an optical waveguide doped with an active medium having a geometry selected so that said optical waveguide supports at least first and second spatial propagation modes light propagating therein, said first and second spatial propagation modes having first and second effective refractive indices, respectively, such that light propagating in one of said first and second spatial propagation modes propagates at a phase velocity that is different from the phase propagation velocity of light propagating in the other of said first and second spatial propagation modes;
inputting a first optical signal having a first wavelength into said optical waveguide so that said first optical signal propagates in said optical waveguide with substantially equal light intensities in said first and second spatial propagation modes in said waveguide, the light propagating in said first spatial propagation mode propagating at a phase velocity that is different from the phase propagation velocity of the light propagating in said second spatial propagation mode thereby causing an optical phase difference between the light propagating in said first spatial propagation mode and the light propagating in said second spatial propagation mode, said optical phase difference varying along the length of said optical waveguide;
inputting a second optical signal having a second wavelength into said optical waveguide to control said first optical signal, said second optical signal propagating in said optical waveguide in said first spatial propagation-mode; and
selectively adjusting the intensity of said second optical signal so that said second optical signal has an intensity sufficiently large to perturb said first effective refractive index with respect to said second effective refractive index to change the phase velocity of the light of said first optical signal propagating in said first spatial propagation mode, thereby introducing an additional optical phase difference between the light propagating in said first spatial propagation mode and the light propagating in said second spatial propagation mode, said additional optical phase difference causing a change in the intensities in first and second lobes of an optical intensity distribution pattern at the output of said optical waveguide.

35. The method as defined in claim 34, further comprising the step of detecting said change in the intensities of said first and second lobes of said optical intensity distribution pattern in said output of said optical waveguide.

36. The method as defined in claim 35, wherein said step of detecting said change in the intensity comprises the step of directing the light from said first and second lobes of said optical intensity distribution pattern toward an optical detector.

37. The method as defined in claim 34, further comprising the step of adjusting the length of said optical waveguide prior to said step of inputting said second optical signal into said optical waveguide so that substantially all of said light intensity is initially in one of said first and second lobes of said optical intensity distribution pattern.

38. The method as defined in claim 37, wherein said step of selectively adjusting the intensity of said second optical signal comprises the step of selecting an intensity of said second optical signal wherein substantially all of said light intensity at said first wavelength is in the other of said first and second lobes of said optical intensity distribution pattern.

39. An optical mode coupling apparatus comprising an optical waveguide doped with an active medium, said apparatus coupling an optical signal propagating in the optical waveguide between propagation modes of the waveguide, the optical signal having an optical signal beat length for the modes, the waveguide comprising a guiding structure formed of materials having dissimilar indices of refraction and having perturbations being spaced at intervals related to the beat length of the optical signal to cause cumulative coupling of said optical signal from one of the propagation modes to another.

40. The apparatus as defined in claim 39, wherein the optical waveguide has a non-circular cross section having cross-sectional dimensions selected such that the waveguide guides a portion of the perturbational signal in a fundamental spatial mode and another portion in a higher order spatial mode, the cross-sectional dimensions of the waveguide being further selected such that the perturbational signal guided by the waveguide in the higher mode propagates in only a single, stable intensity pattern.

41. The apparatus as defined in claim 40, wherein the fundamental spatial mode includes two polarization modes, the cross-sectional dimensions of the core being further selected to cause the polarization modes of the fundamental mode to be non-degenerate.

42. The apparatus as defined in claim 41, wherein the single intensity pattern of the higher order spatial mode includes two polarization modes, the cross-sectional dimensions of the core being further selected to cause these polarization modes to be non-degenerate.

43. The apparatus as defined in claim 39, wherein the core of the waveguide has an elliptical cross section.

44. The apparatus as defined in claim 39, wherein the refractive index perturbations of said waveguide are produced by the optical Kerr effect.

45. The apparatus as defined in claim 39, wherein said propagation modes are first and second order spatial modes of the waveguide.

46. The apparatus as defined in claim 39, wherein the waveguide has a non-circular cross section.

47. A method of controlling an optical signal in an optical waveguide, comprising the steps of:
providing an optical waveguide doped with an active medium, said optical waveguide having at least first and second spatial propagation modes, said first and second spatial propagation modes having first and second refractive indices, respectively;
inputting said optical signal having a first wavelength into said optical waveguide;
inputting a pump signal having a second wavelength into said optical waveguide to optically perturb at least one of said first and second indices of refraction;
selectively adjusting the intensity of said pump signal to controllably vary the spatial intensity distribution of said optical signal.

48. The method of claim 47, further comprising the step of selecting the active medium so that said active medium has a high oscillator strength.

49. The method of claim 47, further comprising the step of selecting said second wavelength to be proximate to an absorption transition of said active medium.

50. The method of claim 47, further comprising the step of selecting said first wavelength to be proximate to an absorption transition of said active medium.

51. The method of claim 47, further comprising the step of selecting said first wavelength to be away from an absorption transition of said active medium.

52. The method of claim 47, further comprising the step of selecting said first and second wavelength to be proximate to the same absorption transition of said active medium.

53. The method of claim 47, further comprising the step of selecting said second wavelength to be proximate to an absorption transition of said active medium and further comprising the step of selecting said first wavelength to be away from said absorption transition.

54. The method of claim 47, further comprising the step of phase shifting said optical signal component propagating in one of said first and second modes.

55. The method of claim 47, wherein said optical signal experiences a loss during its propagation in said optical waveguide, and wherein said pump source has a power, the perturbation of said at least one of the refractive indices phase shifting a component of said optical signal in one of said first and second modes, said method further comprising the step of selecting said first wavelength so as to minimize the loss of said optical signal and so as to minimize the power of said pump source for a specified phase shift, said pump power being reduced and said signal loss being increased when said first wavelength is proximate to an absorption transition of said active medium and, reciprocally, said pump power being increased and said signal loss being reduced when said first wavelength is selected away from an absorption transition of said active medium.

56. The method of claim 47, wherein said optical waveguide has a length and said pump source has a power, the perturbation of said at least one of the refractive indices phase shifting a component of said optical signal in one of said first and second modes, said method further comprising the step of selecting the length of said optical waveguide and the power of said pump source so as to minimize both the length of said optical waveguide and the power of said pump source for a specified phase shift, the minimum length verifying Equation (27) and the minimum power verifying Equation (26).

* * * * *

UNITED STATES PATENT AND TRADEMARK OFFICE
CERTIFICATE OF CORRECTION

PATENT NO. : 5,311,525
DATED : May 10, 1994
INVENTOR(S) : Richard H. Pantell et al It is certified that error appears in the above-indentified patent and that said Letters Patent is hereby corrected as shown below:

In column 33, line 56, replace "leas tone" with --least one--.

Signed and Sealed this

Twentieth Day of September, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO.    : 5,311,525
DATED         : May 10, 1994
INVENTOR(S)   : Richard H. Pantell et al.

It is certified that error appears in the above-identified patent and that said Letters Patent is hereby corrected as shown below:

Column 1,
Line 4, immediately above the caption "FIELD OF THE INVENTION," please insert the following caption and paragraph:

-- GOVERNMENT SUPPORT
This invention was made with Government support under contract DE-FG03-92ER12126 awarded by the Department of Energy. The Government has certain rights in this invention. --

Signed and Sealed this

Twenty-first Day of May, 2002

Attest:

Attesting Officer

JAMES E. ROGAN
Director of the United States Patent and Trademark Office